(12) United States Patent
Miler

(10) Patent No.: US 11,718,194 B2
(45) Date of Patent: Aug. 8, 2023

(54) CHARGING SYSTEM FOR ELECTRIC VEHICLES

(71) Applicant: Jaro Fleet Technologies, Inc., Oakland, CA (US)

(72) Inventor: Josef Miler, Oakland, CA (US)

(73) Assignee: Jaro Fleet Technologies, Inc., Oakland, CA (US)

( * ) Notice: Subject to any disclaimer, the term of this patent is extended or adjusted under 35 U.S.C. 154(b) by 5 days.

(21) Appl. No.: 16/676,423

(22) Filed: Nov. 6, 2019

(65) Prior Publication Data

US 2020/0139835 A1  May 7, 2020

Related U.S. Application Data

(60) Provisional application No. 62/880,645, filed on Jul. 30, 2019, provisional application No. 62/771,771, (Continued)

(51) Int. Cl.
   *B60L 53/30*  (2019.01)
   *B60L 53/66*  (2019.01)
   (Continued)

(52) U.S. Cl.
   CPC ............. *B60L 53/305* (2019.02); *B60L 53/36* (2019.02); *B60L 53/62* (2019.02); *B60L 53/63* (2019.02); *B60L 53/66* (2019.02)

(58) Field of Classification Search
   None
   See application file for complete search history.

(56) References Cited

U.S. PATENT DOCUMENTS 5,272,431 A * 12/1993 Nee .......................... B60L 3/04
                                                          320/109
5,821,731 A    10/1998 Kuki et al.
(Continued)

FOREIGN PATENT DOCUMENTS

DE    102009001080 A1    8/2010
EP        3552863 A1    10/2019
(Continued)

OTHER PUBLICATIONS

Adventures in Fuel Economy, Energy Use, Physics, and Life: Charging the Tesla class 8 semi (Dec. 27, 2017), online], [retrieved on 2020-06-18], Retrieved from the Internet:.
(Continued)

*Primary Examiner* — David V Henze-Gongola
(74) *Attorney, Agent, or Firm* — Weber Rosselli & Cannon LLP

(57) ABSTRACT

Various systems are provided for charging electric vehicles. The systems may include a power transformation module in electrical communication with a power supply, any number of charge nodes in electrical communication with the power transformation module via one or more power distribution lines, and any number of charge transfer devices, each in electrical communication with a power system of an electric vehicle. A charge node of a charge pad may be connected to a contact pad of a charge transfer device to transfer power from the charge node, through the charge transfer device, to the vehicle power system to thereby charge the vehicle.

20 Claims, 15 Drawing Sheets

Related U.S. Application Data filed on Nov. 27, 2018, provisional application No. 62/756,104, filed on Nov. 6, 2018.

(51) Int. Cl.
*B60L 53/36* (2019.01)
*B60L 53/63* (2019.01)
*B60L 53/62* (2019.01)

(56) References Cited

U.S. PATENT DOCUMENTS

| | | | |
|---|---|---|---|
| 10,272,790 B2 | 4/2019 | Bell et al. | |
| 10,518,658 B1 | 12/2019 | Eakins et al. | |
| 10,821,847 B2 | 11/2020 | Eakins et al. | |
| 10,843,584 B2 | 11/2020 | Cole et al. | |
| 11,034,250 B2 | 6/2021 | Zethraeus et al. | |
| 11,279,253 B2 | 3/2022 | Flechi | |
| 2003/0075235 A1* | 4/2003 | Graham | B60L 58/30 141/82 |
| 2011/0066515 A1* | 3/2011 | Horvath | G06Q 20/204 705/17 |
| 2011/0114398 A1* | 5/2011 | Bianco | B60K 1/04 320/109 |
| 2013/0193918 A1* | 8/2013 | Sarkar | H02J 7/02 320/109 |
| 2014/0070767 A1* | 3/2014 | Morris | B60L 53/30 320/109 |
| 2014/0333261 A1 | 11/2014 | Oh et al. | |
| 2016/0167532 A1 | 6/2016 | Weigel et al. | |
| 2016/0332525 A1 | 11/2016 | Kufner et al. | |
| 2017/0096073 A1 | 4/2017 | Mardall et al. | |
| 2021/0122259 A1* | 4/2021 | Dobie | H02J 3/322 |

FOREIGN PATENT DOCUMENTS

| | | |
|---|---|---|
| EP | 3835113 A1 | 6/2021 |
| WO | WO2016096194 A1 | 6/2016 |

OTHER PUBLICATIONS

Akerman, Patrik et al., "Demonsliating a System for Efficient and Sustainable Road Freight Based on Dynamic PowerSupply", Proceedings of 6th Transport Research Arena, Apr. 18-21, 2016, Warsaw, Poland, p. 10.

Chargepoint, Inc., How Do Level 2 and DC Fast Fit in the Electric Vehicle Charging Landscape? (2017), p. 8.

Choe, Brian, Zero Emission Heavy Duty Drayage Truck Demonslialion, South Coast Air Quality Management District [May 16, 2013), p. 17.

Domingues-Olavarria, Gabriel et al., Electric Roads: Analyzing the Societal Cost of Electrifying All Danish Road Transport, World Electric Vehicle Journal. 2018, vol. 9, No. 9 (Jun. 7, 2018), p. 11; doi:10.3390/9010009.

Jeong, Seungmin et al., Economic Analysis of the Dynamic Charging Electric Vehicle, IEEE Transactions On Power Fl FCTRONICS Nov. 2015) vol. 30, No. 11, pp. 6368-6377.

Miller, John M et al., High-Power Wireless Charging Of Heavy Duty EVs: Techniques, Challenges And Limitations, How2Power Today (Dec. 2017), p. 21.

Moultak, Marissa et al., Transitioning to zero-emission heavy- duty freight vehicles, International Council on Clean Transportation (Sep. 26, 2017), p. 3.

National Academies of Sciences, Engineering, and Medicine 2017. Guide to Deploying Clean Truck Freight Strategies. Washington, DC: The National Academies Press. (2017), pp. 16-17.

Dakleaf, Brett, Smart Ports. Technology Advancements in Intermodal Transportation (Mar. 7, 2018), National Renewable Energy Laboratory, p. 27.

Overhead Catenary System Demonslialion Concept Overview, WCC Goods Movement Webinar (Jun. 2, 2015), p. 21.

* cited by examiner

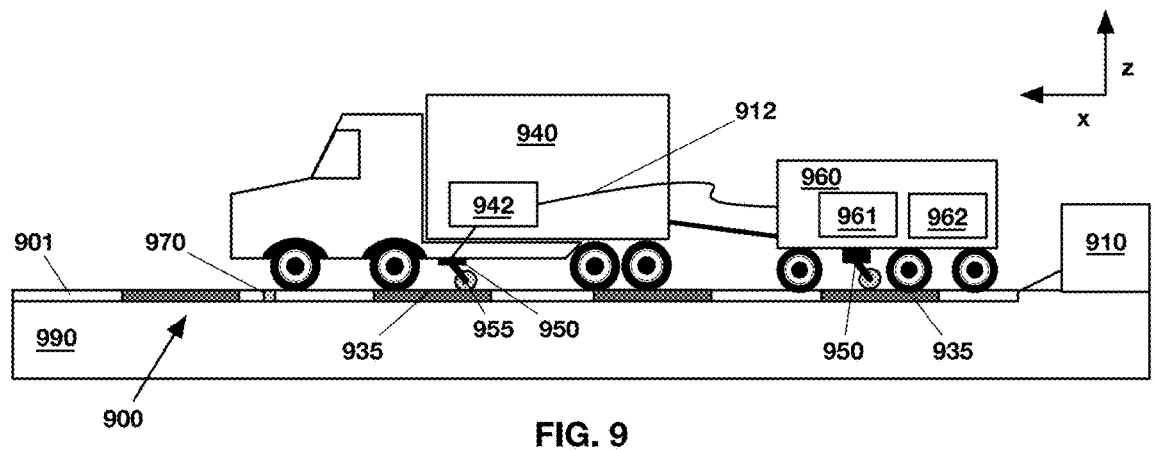
FIG. 9
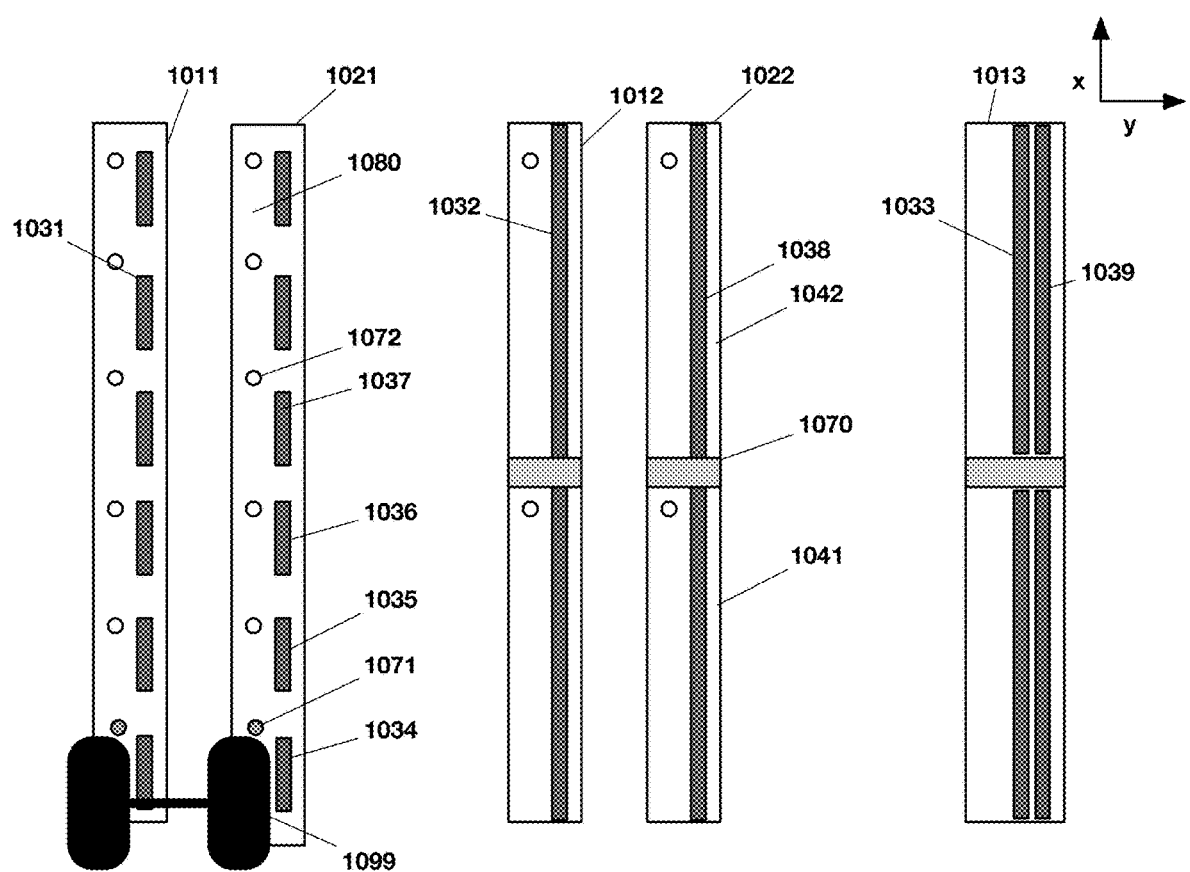
FIG. 10A  FIG. 10B  FIG. 10C

CHARGING SYSTEM FOR ELECTRIC VEHICLES

CROSS-REFERENCE TO RELATED APPLICATIONS

The present application claims the benefit of U.S. provisional patent application Ser. No. 62/756,104, titled "Electrification System for Vehicles," filed Nov. 6, 2018; U.S. provisional patent application Ser. No. 62/771,771, titled "Electrification System for Vehicles," filed Nov. 27, 2018; and U.S. provisional patent application Ser. No. 62/880,645, titled "Electrification System for Vehicles," filed Jul. 30, 2019. Each of the above applications is incorporated by reference herein in its entirety.

BACKGROUND

This specification relates to systems for charging electric vehicles, such as electric trucks and other commercial electric vehicles.

Electric trucks and other commercial electric vehicles ("EVs") offer numerous benefits over their fossil fuel-powered counterparts, including reduced environmental impact (e.g., reduced noise pollution and harmful emissions), simpler design, lower long-term maintenance, and lower fuel costs. Moreover, favorable government regulations and subsidies provide strong incentives for businesses to employ such EVs, and recent improvements in battery and power-electronic technologies have made these vehicles viable for large-scale implementation. It is, therefore, not surprising that the demand for electric trucks has increased significantly over recent years, and the market is predicted to grow to over 1.5 million vehicles by 2025.

Although electric trucks are poised to claim a larger share of the automotive market, their large-scale implementation brings with it unique challenges, such as the need for new infrastructure and development investments. Indeed, charging infrastructure remains one of the largest unknowns for fleets considering adoption of commercial EVs.

While currently available charging systems allow for off-shift charging of EVs, such systems are not cost-effective for commercial EVs, as they require exceedingly long charging times and are not available at shipping ports or other facilities where commercial vehicles operate. Moreover, conventional charging systems can suffer from a lack of standardization and such systems may not be compatible with EVs having differing voltage requirements and/or charging circuitry.

Accordingly, there remains a need for a high-speed, modular and cost-effective EV charging systems. It would be beneficial if such systems could be configured to dynamically determine charging requirements of EVs in order to appropriately provide and distribute power to each vehicle. It would be further beneficial if such systems could be employed to provide power to both stationary and/or moving vehicles.

SUMMARY

In accordance with the foregoing objectives and others, exemplary systems for charging electric vehicles are disclosed herein. Exemplary systems may allow for the transmission, conditioning, and monitoring of electrical power supplied to an electric vehicle upon energization of the charging system. Exemplary embodiments further provide for the collection and/or transmission of vehicle information (e.g., vehicle identification) and system information (e.g., system performance and diagnostic logs) from any number of devices (e.g., a central controller, a charge transfer device and a charge node).

In one embodiment, a charging system is provided that includes a power transformation module adapted to connect to a power supply, a power distribution module adapted to distribute power from the transformation module to any number of in-road or overhead charge nodes, and any number of charge transfer devices adapted to receive power from the charge nodes and provide the same to a vehicle power system of one or more electric vehicles.

In some embodiments, the system may include a central monitoring and control system in communication with the various system components via a network. Generally, the monitoring and control system may be configured to conduct safety checks, permit the charge node to energize the system, and receive and transmit vehicle and safety information to the charge node and/or the charge transfer device.

The power transformation module may include one or more alternating-current-to-direct-current ("AC/DC") transformers adapted to connect to the power supply. Generally, the AC/DC transformers may be configured to: transform electrical power supplied by the power supply to the appropriate current and voltage for distribution over one or more power distribution lines, conduct safety checks, and permit the charge node to energize the charging system such that it may charge an electric vehicle.

The system may also include any number of electric vehicles, wherein each vehicle is fitted with a charge transfer device. Generally, the charge transfer device may be configured to: transmit electrical power from the charge node to a power system of an electric vehicle; condition power received from the power supply; and communicate with the various system components, such as the monitoring and control system, the AC/DC transformers, and/or the electric vehicle to receive and transmit vehicle and system information.

In one embodiment, the charge transfer device may communicate with the central monitoring and control system to send and/or receive safety-related signals, load estimation and load prediction, system performance and diagnostic logs, and power delivery logs. The charge transfer device may communicate with the AC/DC transformer to send safety-related signals, load estimation and load prediction, vehicle identification (e.g., unique vehicle ID) and power delivery logs. And, in some embodiments, the charge transfer device may communicate with the vehicle to determine battery voltage, identify a vehicle ID, communicate maximum acceptable power, and close and/or open contactors. As used herein, a "contactor" refers to any electromechanical device that may be employed to open or close an electrical connection in response to a control signal.

Generally, the charge node may be configured to: connect to the AC/DC transformer and energize the charging system; form an electrical connection to the charge transfer device; transform, invert, and/or condition electrical power supplied by the power supply; control the electrical connection between the charge node and the power supply; communicate with a central monitoring and control system with regards to vehicle identification information; store records of charging events and/or error logs; and/or monitor charge transferred to the vehicle.

The details of one or more embodiments of the subject matter of this specification are set forth in the accompanying drawings and the description below. Other features, aspects,

BRIEF DESCRIPTION OF THE DRAWINGS

FIG. 9 shows an exemplary charging system comprising a track system 980 embedded within a roadway 990.

FIGS. 10A-10C show top views of exemplary track systems for use in the charging system of FIG. 9.

DETAILED DESCRIPTION

Various systems are described herein to charge electric vehicles. The embodiments may provide appropriate charging power to vehicles at discrete charging locations and/or along quasi-continuous charging tracks or charging surfaces. Moreover, the embodiments may be configured to provide dynamic charging (i.e., while a vehicle is moving with respect to the ground) and/or static charging (i.e., when a vehicle is stationary).

In certain embodiments, the charging system may connect to the power system of a vehicle at one or more locations to transmit energy via conductive charging. For example, the charging system may connect to a location under the vehicle, on the side of the vehicle and/or above the vehicle. In another embodiment, the charging system may couple to a standard charge port of the vehicle. And, in yet other embodiments, the charging system may transmit energy to the vehicle via inductive wireless charging.

Overview

Figure 1:
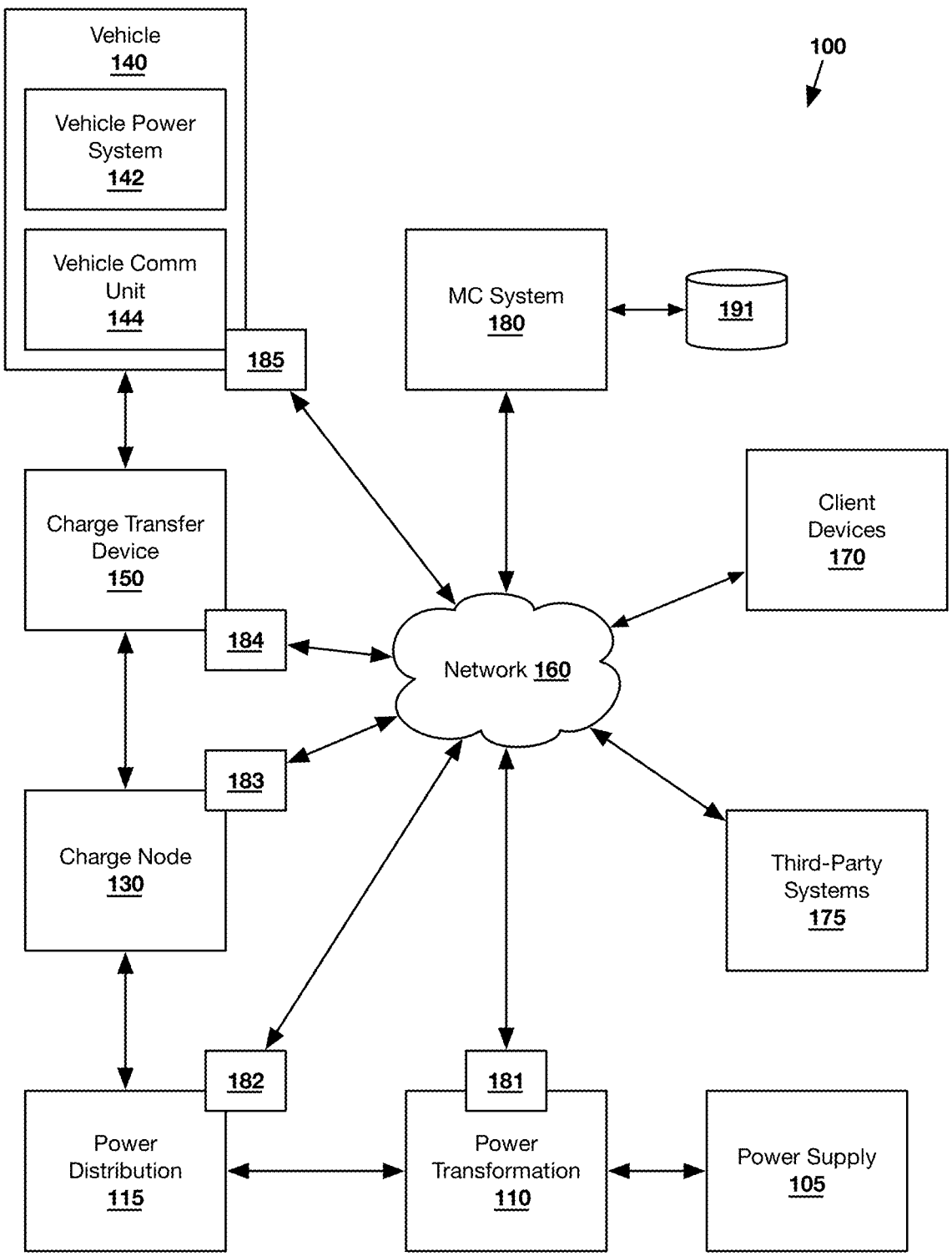
FIG. 1 shows an exemplary charging system 100 according to an embodiment.

Referring to FIG. 1, an exemplary electric vehicle charging system 100 according to an embodiment is illustrated. As shown, the system 100 may comprise a power transformation module 110, a power distribution module 115, one or more charge nodes 130, one or more charge transfer devices 150, and a monitoring and control ("MC") system 180.

In one embodiment, the charging system 100 may comprise a power transformation module 110 in electrical communication with a power supply 105, such as a local utility grid transformer. The power transformation module 110 is generally adapted to receive an electrical output from the power supply 105 and transform the same into an electrical flow that may be distributed to the various downstream system components (e.g., charge nodes 130 and/or charge transfer devices 150) via the power distribution module 115.

The power transformation module 110 may comprise one or more AC/DC transformers, step-down transformers, and/or inverters having appropriate power electronics components to safely, efficiently, and reliably transform the power received from the power supply 105 to the appropriate current and voltage for distribution via the power distribution module 115. It will be appreciated that the appropriate current and voltage may be determined based on characteristics and/or requirements of the power distribution module 115 (e.g., current-carrying capacity, thermal management capabilities, voltage isolation and arc prevention, ingress protection, and/or creepage-and-clearance protections), the charge nodes 130, the charge transfer devices 150 and/or requirements of any vehicles 140 in communication with the charging system 100. Nevertheless, in certain embodiments, the power transformation system may be adapted to output power at up to about 1,000 VDC and up to about 450 kW per vehicle, for up to 10 vehicles.

As shown, the power transformation module 110 may be in electrical communication with a power distribution module 115. Generally, the power distribution module 115 may comprise any number of power lines configured to transfer electrical power from the power transformation module to the charge nodes 130. The power lines may be embedded within a roadway or may extend on, or above, the ground surface. The power lines may be enclosed in a protective conduit. In any event, the power lines of the power distribution module 115 may be configured to transmit power at up to about 1,000 VDC and up to about 450 kW per vehicle, for up to 10 vehicles.

In one embodiment, the power distribution module 115 may comprise various thermal management features. Such features may include, but are not limited to, active and/or passive liquid thermal management systems, air thermal management features (e.g., air circulation features, air heat sinks, etc.), and/or conductive thermal management features. With respect to conductive thermal management, exemplary features may include, but are not limited to, high-thermal-conductivity elements to transport heat from electrical elements to external heat sinks (e.g., thermally conductive polymers and/or electrically-insulated metal components).

The power distribution module 115 may additionally or alternatively comprise various features to manage vapor buildup. Exemplary vapor management features may include, but are not limited to: hydrophobic, gas-porous membranes (e.g., GORE-TEX membranes); vapor vents with geometric features to prevent liquid ingress; and/or desiccant materials, with or without a heating mechanism.

In one embodiment, the power distribution module 115 may comprise various features to mechanically react mechanical loads, such as the weight of a vehicle located on a roadway in which the power lines are embedded. For example, the power lines employed in certain embodiments may comprise structural elements, such as ribs, to ensure structural integrity. As another example, the power lines may comprise suitable materials, such as materials having a relatively high compressive modulus (e.g., engineering polymers such as rubber or high molecular weight polyethylene), metals (e.g., aluminum or steel) and/or ceramics (e.g., concrete).

It will be appreciated that the employed power lines may further comprise various features to enable efficient installation and maintenance within a roadway. As an example, the power lines may be connected to a roadway via a removable adhesive or a bolted connection. As another example, the power distribution lines may comprise interchangeable sections of lines to enable quick swap-in/swap-out. And as yet another example, the power distribution lines may comprise poka-yoke features to ensure correct polarity of connections.

As shown, the charge system further comprises any number of charge nodes 130 in electrical communication with the power distribution module 115. As explained in detail below, the charge nodes 130 are generally adapted to receive power from the power distribution module 115 in order to safely, efficiently, and reliably deliver such power to a charge transfer device 150 upon request.

Accordingly, the system may comprise any number of charge transfer devices 150, wherein each device is adapted to receive electrical power from one of the charge nodes 130 and to provide such power to the vehicle's power supply. In certain embodiments, each charge transfer device 150 may be physically attached to a vehicle 140, for example, at a bottom surface of a vehicle's chassis.

Each charge transfer device 150 may also be in electrical communication with the vehicle's 140 power system 142 via connection to a suitable location. It will be appreciated that such location may vary from one vehicle to another. On some vehicles, the connection may be made to the high-voltage distribution center. On other vehicles, the connection may be made to the high-voltage battery pack. On yet other vehicles, the connection may be made to the onboard charge port hardware. And on yet other vehicles, the connection may be made to a junction point in the vehicle high-voltage power lines.

As discussed below with respect to FIG. 3, the charge transfer device 150 may comprise a power conditioning module adapted to condition a high-voltage power input for transmittal to a vehicle power system. Additionally or alternatively, the charge transfer device 150 may comprise a circuit within a separate power conditioning module capable of diagnosing electrical problems in the setup (e.g., loss of isolation) and/or capable of estimating total charge transferred to the vehicle.

As shown, one or more electric vehicles 140 may connect to the charging system 100 in order to receive electrical power therefrom. Generally, each vehicle 140 comprises a vehicle power system 142 that includes a battery made up of any number of electrochemical battery cells, capacitors, or supercapacitors (e.g., double-layer capacitors). The vehicle power system 142 may be capable of absorbing and restoring a large quantity of electrical energy at a high rate and with high efficiency. Exemplary electric vehicles may include, but are not limited to trucks, cars, buses, forklifts, autonomous vehicles, drones, motorcycles, trams, and/or other mobile machines and/or storage apparatuses that may be used to transport people and/or cargo. For simplicity, vehicles that are receiving or providing electrical charge in a charging facility are referred to herein as "charging vehicles" and vehicles that are authorized to charge in a charging facility are referred to herein as "authorized vehicles" (discussed below).

It will be appreciated that the voltage accepted by a given vehicle power system 142 may vary depending on the type of vehicle 140, with most vehicles requiring a fixed voltage range on the order of about 300V to about 1,000V. Importantly, the disclosed embodiments employ the charge transfer devices 150 and, optionally, the charge nodes 130 to allow for any such vehicle to be charged. Accordingly, in order to receive power from the charging system 100, a vehicle power system 142 may be placed in electrical communication with a charge transfer device 150 and the charge transfer device may, in turn, be placed in electrical communication with a charge node 130 of the charging system 100.

As shown in FIG. 1, in certain embodiments, the charging system 100 may comprise a network 160 to which various components of the system 100 may be connected. The network 160 may include wide area networks ("WAN"), local area networks ("LAN"), intranets, the Internet, wireless access networks, wired networks, mobile networks, telephone networks, optical networks, or combinations thereof. The network 160 may be packet switched, circuit switched, of any topology, and may use any communication protocol. Communication links within the network 160 may involve various digital or an analog communication media such as fiber optic cables, free-space optics, waveguides, electrical conductors, wireless links, antennas, radio-frequency communications, and so forth.

In one embodiment, the system further comprises a central MC system 180, which is generally adapted to maintain processing conditions within acceptable operational constraints throughout the system. Such constraints may be determined by economic, practical, and/or safety requirements. The MC system 180 may handle high-level operational control goals, low-level PID loops, communication with both local and remote users, and communication with both local and remote systems. The MC system 180 may also be in communication with ancillary systems, such as storage systems, backup systems and/or power generation systems In one embodiment, the MC system 180 may be in communication with any number of MC subsystems (181-185) comprising monitoring and control equipment, such as sensors and/or controllers, via the network 160. The MC subsystems may be in further communication with one or more components throughout the charging system 100 such that the MC system 180 may remotely monitor and control operating parameters at various locations. For example, one or more A/C transformers of the power transformation module 110 may be in communication with an MC subsystem 181; one or more power lines of the power distribution module 115 may be in communication with an MC subsystem 182; one or more charge nodes 130 may be in communication with an MC subsystem 183; one or more charge transfer devices 150 may be in communication with an MC subsystem 184; and/or one or more components of a vehicle (e.g., a vehicle power system 142 and/or a vehicle communication unit 144) may be in communication with an MC subsystem 185.

Generally, the MC system 180 may be configured to monitor and/or control parameters, such as but not limited to, voltage, current, frequency, inductance, resistance and/or other relevant electrical properties of electrical connections between system components. For example, the MC system 180 may monitor/control such parameters for a connection between the vehicle 140 and the charge transfer device 150. As another example, the MC system 180 may monitor/control one or more of such parameters for a connection between the charge transfer device 150 and the charge node 130. As yet another example, the MC system may monitor/control such parameters for a connection between the charge node 130 and the power distribution module 115. In another example, the MC system 180 may monitor/control such parameters for a connection between the power transformation module 110 and either the power distribution module 115 or the power supply 105.

In one embodiment, the MC system 180 (e.g., a MC subsystem 184 located at the charge transfer device 150) may communicate with the vehicle 140 using vehicle-specified communications protocols such as OBD-II codes; such communications may include electrical properties of the electrical connection, commands from the vehicle for power conditioning and/or safety, status information about the battery system and/or other relevant vehicle systems, and/or other vehicle information or commands necessary to ensure safe, reliable, efficient electricity transmission to and/or from the vehicle.

In one embodiment, the MC system and/or any of the MC subsystems (181-185) may comprise, or otherwise be connected to, a communication unit to allow communication among the MC system components. Exemplary communication units may comprise one or more readers, scanners, sensors, receivers and/or other input transducers. For example, communication units may include, but are not limited to: keyboards, touchscreens, pointing devices, cameras, video recorders, microphones, radio frequency ID ("RFID") receivers, near field communication ("NFC") receivers, Bluetooth receivers, Bluetooth Low Energy ("BLE") receivers, GPS sensors, WiFi receivers, cellular receivers (CDMA, GSM, LTE, etc.), ZIGBEE receivers, and/or credit card scanners. Exemplary sensors may include relative humidity sensors, moisture sensors, water leak sensors, temperature sensors, voltage sensors, current sensors, switch state indicators, and/or others.

Communication units may additionally or alternatively comprise one or more output transducers. For example, computing units may comprise one or more of the following: RFID transmitters, NFC transmitters, Bluetooth transmitters, BLE transmitters, cellular antennae (CDMA, GSM, LTE, etc.), WIFI transmitters, ZIGBEE transmitters, Ethernet transceivers, monitors, displays, LEDs, speakers, vibration motors and/or other output devices. In the case of wired connections, conductive signals such as electrical signals may be transceived via the same high-voltage power lines or via separate auxiliary power lines.

In one particular embodiment, the communications unit may comprise a CAN connection. For example, an MC subsystem 184 located at a charge transfer device 150 may connect to a vehicle power system 142 and/or other high-voltage components on the vehicle 140 via such connection. It will be appreciated that a CAN connection may be established between the MC subsystem 184 and the vehicle power system 142 (or other vehicle components) and/or among such components and a separate CAN communication hub (e.g., vehicle communications unit 144).

In one embodiment, the communications unit may include features to provide durability, such as structural protection from scratching or other mechanical abuse and/or encapsulation layers to protect from damage. Additionally or alternatively, the communications unit may comprise one or more features to reduce interference from debris or dirt, such as oleophobic coatings, self-cleaning functions, brushes that use the mechanical motion of the truck to clean debris, and/or air-jet systems.

Exemplary communications units may additionally or alternatively comprise one or more features to provide electrical robustness. For example, a communications unit may comprise electromagnetic shielding to shield the unit from other components and/or to shield other components from the unit. As another example, the communications unit may comprise waveguides or other components to improve signal integrity.

In yet other embodiments, the communications units may comprise various features to provide redundancy. For example, a single communication unit may comprise multiple antennae, wherein each antenna is adapted to transmit information to a receiver. As another example, a single system component may have a plurality of communication units attached thereto, at various locations.

It will be appreciated, with respect to the vehicle ID, such information may be transmitted via a communications unit positioned anywhere on/in a vehicle 140. For example, a communications unit may be affixed to a surface of a vehicle (e.g., on an inner surface of the windshield, on a bottom surface of the chassis). As another example, the communications unit may be included on/in the charge transfer device 150. As yet another example, the communications unit may be integrated into an electrical system of the vehicle, such as the vehicle's onboard communication device and/or a CAN communications hub.

In one embodiment, any number of users may access the MC system 180 via a client device 170 in communication with the network 160. Generally, a client device 170 may be any device capable of accessing such system (e.g., via a native application or via a web browser). Exemplary client devices 170 may include general purpose desktop computers, laptop computers, smartphones, and/or tablets. In other embodiments, client devices 170 may comprise virtual reality ("VR") and/or augmented reality ("AR") hardware and software, which allow users to provide input via physical gestures.

The relationship of the client device 170 to the MC system 180 arises by virtue of computer programs running on the respective computers and having a client-server relationship to each other. Accordingly, each of the client devices 170 may have a client application running thereon, where the client application may be adapted to communicate with an MC application running on an MC system 180, for example, over a network 160. Thus, the client application may be remote from the MC system 180. Such a configuration may allow users of client applications to interact with such systems from any location. Moreover, because the MC system is capable of transceiving information to/from the various other systems (e.g., power transformation 110, power distribution 115, charge nodes 130, charge transfer devices 150, vehicle power systems 142), a user may interact with such systems via the MC system.

In some embodiments, one or more applications may be adapted to present various user interfaces to users. Such user interfaces may be based on information stored on the client device 170 and/or received from the respective systems. Accordingly, the application(s) may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code).

Each of the MC system application(s) can be deployed and/or executed on one or more computing machines that are located at one site or distributed across multiple sites and interconnected by a communication network. In one embodiment, an application may be installed on (or accessed by) one or more client devices 170. In certain embodiments, computing machines may be present at various locations within a charging facility (e.g., the power transformation module 110, power distribution module 115, charge nodes 130, charge transfer devices 150 and/or one or more vehicles 140) and/or may be carried by service providers throughout a charging facility.

In one embodiment, the MC system 180 and/or the client device 170 may be adapted to receive, determine, record and/or transmit application information relating to one or more components of the charging system 100. The application information may be received from and/or transmitted to the power transformation module 110, power distribution module 115, charge nodes 130, charge transfer devices 150, and/or vehicle 140 via, for example, monitoring and/or control equipment (181, 182, 183, 184, 185, respectively) in communication with one or more components of such systems and in further communication with the network 160. Moreover, any of such application information may be stored in and/or retrieved from one or more local or remote databases (e.g., database 191).

Exemplary application information may comprise (1) vehicle information relating to one or more vehicles entering, exiting and/or charging in a given charging facility (e.g., a vehicle ID and/or other vehicle information); (2) payment information relating to payments for charging (e.g., payment method, credit card number, amount paid, expiration date, and/or billing information); (3) charging information relating to locations in which vehicles are charging within a charging facility (e.g., a charge node ID of a specific charge node from which a vehicle is receiving, or attempting to receive, power); and/or system information such as voltage, current, power, temperature, and/or duration at various system locations.

In any event, the MC system 180, including the MC subsystems 181-185, may communicate to monitor and control various operating parameters, such as but not limited to, electrical output at one or more locations, electrical load at one or more locations, and/or others. In certain embodiments, the MC system 180 may monitor and control safety-related information (e.g., emergency off signals), load-estimation and/or load-prediction information, power delivery logs (e.g., total energy per vehicle), system performance and/or diagnostic logs. Additionally or alternatively, the MC system may monitor vehicle battery voltage, open/close contactors, communicate max acceptable power, and/or determine a vehicle ID.

In one embodiment, the MC system 180 may be adapted to store charging facility information for any number of charging facilities associated with the charging system in the database 191. Such charging facility information may include, but is not limited to: operating hours, charging station information, a count of charging vehicles at a given time or within a given period, a vehicle ID for each charging vehicle at a given time or within a given period, and/or location information relating each charging vehicle (e.g., at a given time or within a given period).

The charging facility information may also include, or otherwise be associated with, account information corresponding to authorized vehicles and/or charging vehicles. Exemplary account information may include, but is not limited to, a unique account ID, vehicle information for one or more vehicles, operator information for one or more operators of such vehicles, payment information, charging information and/or authorization information (each discussed in detail below).

Exemplary vehicle information may include, but is not limited to: a unique vehicle ID, vehicle identification number (VIN), make, model, year, color, license plate number, registration number, insurance information, other identifying vehicle information, vehicle power requirements, maximum battery capacity, acceptable power characteristics (e.g., maximum voltage, maximum current), etc.

Exemplary operator information may include, but is not limited to: a unique operator ID, name, driver's license information, insurance information, contact information and/or other identifying information.

Exemplary payment information may include, but is not limited to: an amount paid to charge a vehicle in a charging facility, any balance owed, a payment method, billing information, payment history, and/or other information relating to billing and/or payments relating to vehicle charging.

And exemplary charging information may include, but is not limited to: one or more charging facilities in which one or more vehicles associated with an account are authorized to charge; a fee and/or rate to be assessed for charging in such facilities; a vehicle charging status (e.g., charging, charging in a specific location, or not charging); one or more charge node IDs relating to authorized charging locations in one or more facilities in which vehicle(s) associated with the account are authorized to charge or are currently charging; and/or historical charging information for one or more vehicles associated with the account.

In one embodiment, some or all of the account information may be manually entered into the system by one or more users (e.g., a vehicle operator, a service provider and/or an admin user). For example, a user may input any account information into a client application and such information may be transmitted to the MC system 180 and stored in the database 191.

In another embodiment, a client device 170 or MC subsystem 181-185 may be employed to scan, read or otherwise determine such information. For example, a client device may scan an operator's license in order to determine operator information, such as a name, address, license number, license state, date of birth, etc. As another example, a client device may scan an operator's credit card and/or mobile phone (e.g., via Apple Pay, Google Pay, or other mobile payment platforms) to determine payment information. In one particular embodiment, a client device or communications unit located at a charge node may receive a vehicle ID transmitted from another device located on/in a vehicle and/or a charge transfer device.

In one embodiment, the MC system 180 may be connected to one or more third-party systems 175 via the network 160. Third-party systems 175 may store information in one or more databases that may be accessed by the MC system 180. Such components may be capable of retrieving and/or storing information from third-party systems 175, with or without user interaction. Moreover, such components may be capable of transmitting stored/received information to such third-party systems. Exemplary third-party systems 175 may include, but are not limited to: registration systems, authorization systems, services management systems, access control systems, security and surveillance systems, financial systems (e.g., billing, invoicing, and/or accounting systems), contact management systems, customer relationship management ("CRM") systems, calendaring systems, mapping systems, communication systems and others.

Finally, it will be appreciated that the system 100 may employ devices and procedures to ensure safe charging such as ground-fault detection circuits, isolation fault detection circuits and algorithms, debris detection systems, high-resistance contact detection circuits or algorithms, EMI shielding, hazardous gas detection, temperature detection, spark detection systems, arc detection systems, contactor control test circuits and algorithms, and/or fuse integrity test circuits and algorithms. In one embodiment, a variety of safety measures are deployed, especially isolation loss detection via leakage current measurements. In another embodiment, one or more fuses, emergency shutoff switches, contactors, isolation measurement devices and/or voltage measurement devices are employed at one or more locations throughout the system. It will be appreciated that such safety features may be in electrical communication with the MC system and/or may operate independently of the MC system.

Power Conditioning

Figure 2:
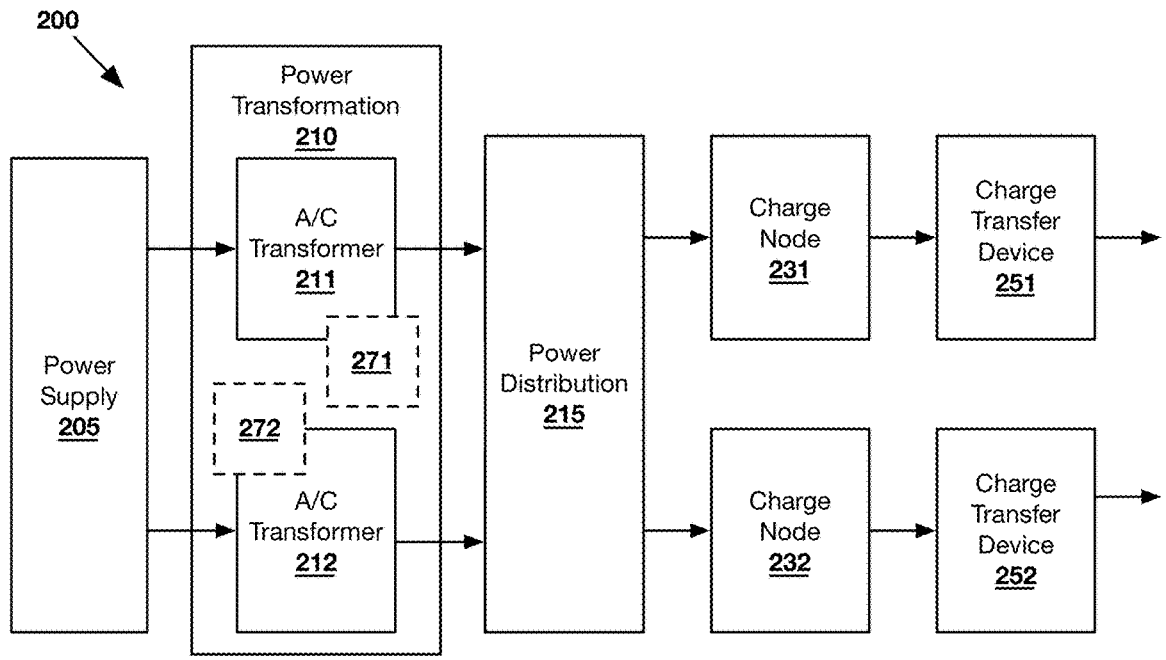
FIG. 2 shows an exemplary charging system 200 according to an embodiment, wherein power conditioning is performed at the power transformation module 210.
Figure 3:
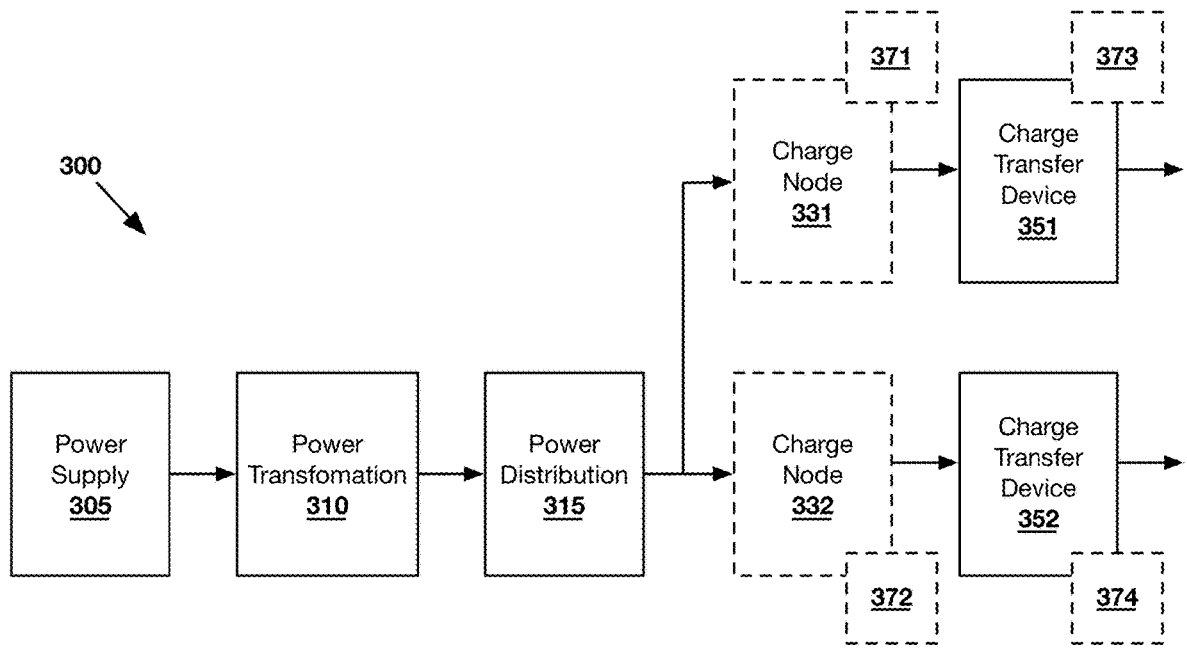
FIG. 3 shows an exemplary system 300 according to an embodiment, wherein power conditioning is performed at the charge nodes 331, 332 and/or at the charge transfer devices 351, 352.

Referring to FIGS. 2-3, exemplary charging systems 200, 300 are illustrated to include power conditioning modules 271, 272, 371, 372, 373, 374 at various locations. FIG. 2 shows an embodiment wherein power conditioning is primarily achieved via modules 271, 272 located within the power transformation module 210. And FIG. 3 shows embodiments wherein power conditioning may be achieved via modules 371-374 located at the charge nodes 331, 332 or the charge transfer devices 351, 352.

Generally, a power conditioning module may comprise electrical components to control the current provided to, or received from, a vehicle. In certain embodiments, the power conditioning module may comprise components, such as a variable resistor, IBGTs, electrical contactors, fuses and/or other circuit elements capable of controlling circuit current. These controllable elements may have preset limits and responses to system currents, for example in a firmware look up table, or may be controlled by a central MC system (e.g., FIG. 1 at 180).

In one embodiment, the power conditioning module may additionally or alternatively comprise one or more of: a hall effect current sensor, a transformer or current clamp meter, a fluxgate transformer type, a circuit with resistor and voltage sensor, a fiber optic current sensor using interferometry, or a Rogowski coil. In one embodiment, the module may comprise a shunt resistor and voltage measurement may be employed to determine current.

In the case of a conductive connection between the vehicle and the charging system, the power conditioning module may comprise means to pre-charge the connection point on the charging system side, such as a pre-charge circuit that includes a relatively high-resistance resistor and/or inductor in series with an appropriately sized contactor, both of which are in parallel to the main high-voltage connection contactor.

In the case of an inductive charging connection between a vehicle and the charging system, the power conditioning module may comprise appropriate electric circuits to power a wireless charging device accounting for inductance, resistance, and other relevant properties of the wireless charging device.

As shown in FIG. 2, the system 200 may comprise a power transformation module 210 comprising a plurality of AC/DC transformers 211, 212 connected to a power supply 205, such as a utility transformer. Each of the AC/DC transformers 211, 212 may also be in electrical communication with a charge node 231, 232 via a power distribution module 215 comprising power lines. In turn, each charge node 231, 232 is in further electrical communication with a charge transfer device 251, 252.

In such embodiment, each AC/DC transformer 211, 212 may receive an alternating current (e.g., at about 480 V) from the power supply 205. And, by employing power conditioning functionality 271, 272, each AC/DC transformer 211, 212 may condition the received alternating current to an electrical signal having appropriate characteristics for distribution to a vehicle via power distribution module 215, the charge node 231, 232 and the charge transfer device 251, 252. For example, each power conditioning module 271, 272 may condition the received electrical signal to a direct current of from about 775 V to about 825 V.

It will be appreciated that such configuration generally allows the system to deliver power to vehicles at an appropriate vehicle voltage while reducing technical challenges of installing power conditioning devices within charge nodes 231, 232 and/or charge transfer devices 251, 252.

Referring to FIG. 3, an exemplary system 300 is illustrated wherein power conditioning is primarily achieved via the charge nodes 331, 332 or the charge transfer devices 351, 352, rather than the power transformation module 310. As shown, the system 300 may comprise power transformation module 310 comprising a single AC/DC transformer in electrical communication with a power supply 305 (e.g., a utility transformer) and a plurality of charge nodes 331, 332 (via power distribution module 315). In turn, each charge node 331, 332 is in further electrical communication with a charge transfer device 351, 352.

In one such embodiment, the AC/DC transformer may transform an alternating current received from the electricity source (e.g., 480 VAC) to a high-voltage direct current (HVDC) of about 10,000 V. The HVDC may then be distributed, via power distribution lines, to power conditioning modules 371, 372 located at the charge nodes 331, 332 for conditioning. For example, each power conditioning module may condition the HVDC to a suitable voltage (e.g., about 775V to about 800 V) for transfer to a vehicle via a charge transfer device 351, 352.

In an alternative embodiment, the HVDC may be conditioned by power conditioning modules 373, 374 located at the charge transfer devices 351, 352, rather than the charge nodes. For example, the HVDC may be distributed from the AC/DC transformer, through the power distribution lines, to the charge nodes 331, 332, and then from each charge node to a charge transfer device 351, 352 for conditioning. In such case, the power conditioning modules 373, 374 located at each charge transfer device may condition the HVDC to a suitable voltage for transfer to a vehicle power system (e.g., about 775 V to about 800 V).

It will be appreciated that, in an alternative embodiment, each charge transfer device 351, 352 may receive the HVDC directly from the power distribution module 315. In such embodiment, power conditioning modules 373, 374 located at each charge transfer device 351, 352 may transform the HVDC to a suitable voltage for transfer to a vehicle power system (e.g., about 775 V to about 800 V), without employing a charge node.

Figure 4:
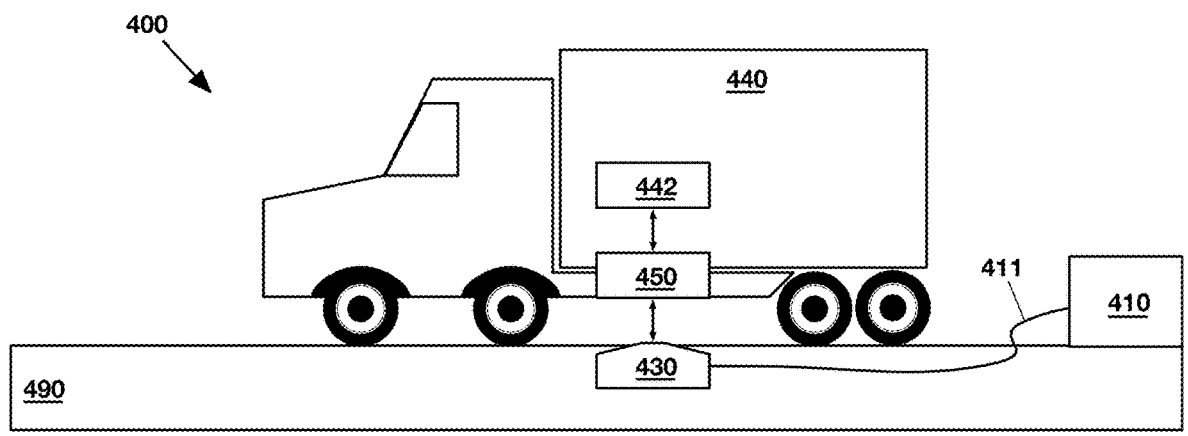
FIG. 4 shows an exemplary charging system 400 comprising charge nodes 430 embedded within a roadway 490.

Referring to FIG. 4, an exemplary charging system 400 is illustrated wherein power is delivered to the power system 442 of a vehicle 440 via a charge node 430 embedded within a roadway 490.

As shown, the system 400 comprises a charge node 430 in electrical communication with a power transformation module 410 via one or more power distribution lines 411 embedded within the roadway 490. The charge node 430 is also in electrical communication with a charge transfer device 450, which may be fixed to a vehicle 440 and in electrical communication with the vehicle's power system 442. Accordingly, the charge node 430 may transfer power received from the power transformation module 410 to the charge transfer device 450, and the charge transfer device 450 may transfer the power to the vehicle's power system 442 to thereby charge the vehicle 440.

As discussed above, power conditioning may be performed at various locations in the illustrated system 400. For example, power conditioning may be performed at the power transformation system 410, at the charge node 430 and/or at the charge transfer device 450.

Figure 5:
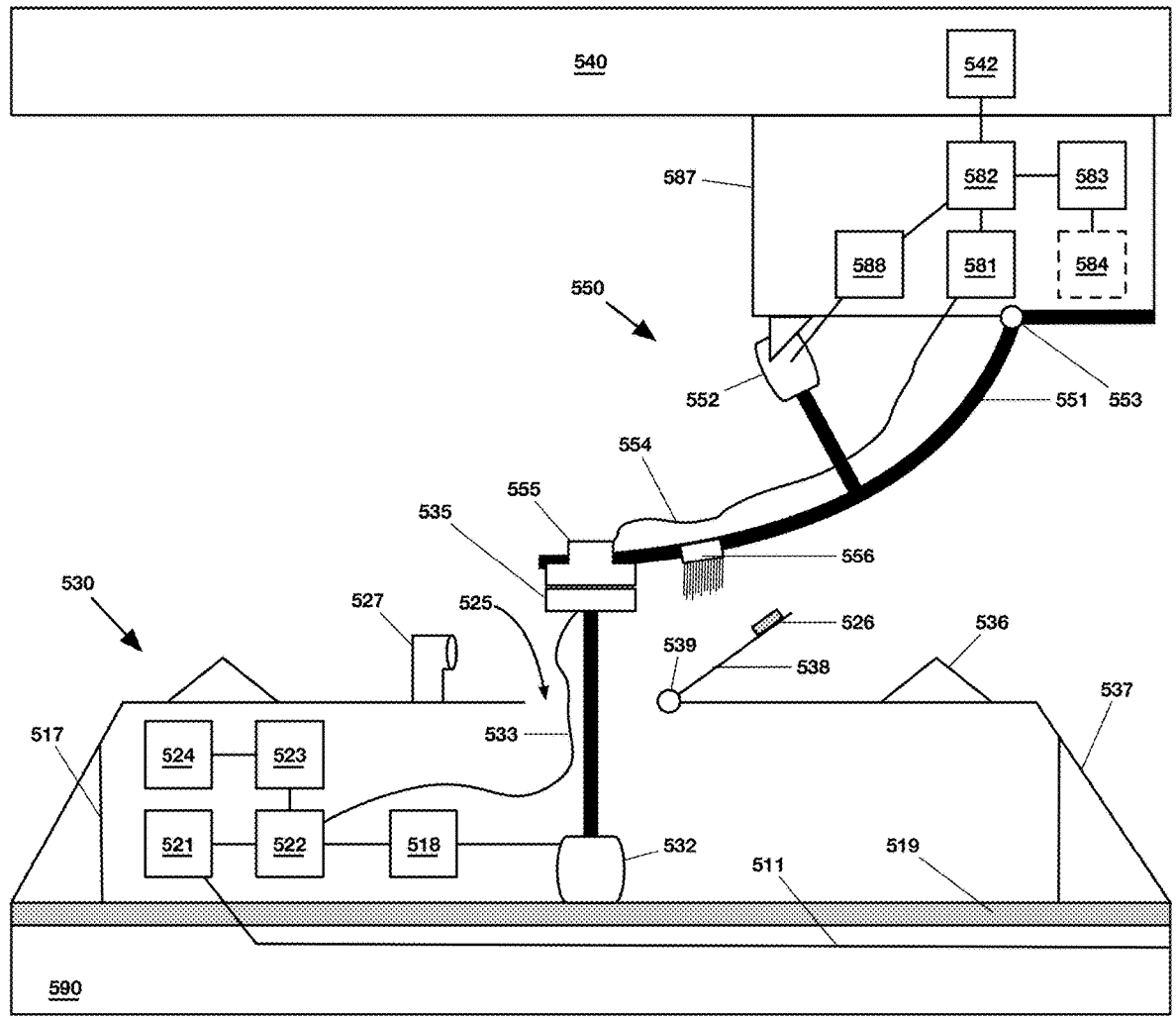
FIG. 5 shows an exemplary charge node 530 and an exemplary charge transfer device 550 for use in the system of FIG. 4.

Referring to FIG. 5, cross-sections of an exemplary charge transfer device 550 and an exemplary charge node 530 for use in the system shown in FIG. 4 are illustrated. As shown, the charge node 530 is in electrical communication with a power distribution line 511 embedded within a roadway 590. The charge node 530 is also in electrical communication with a charge transfer device 550, which is fixed to a vehicle 540 and in electrical communication with the vehicle's power system 542.

In one embodiment, the charge node 530 comprises various circuit components to safely, efficiently, and reliably deliver appropriate power from a power distribution line 511 to a vehicle 540 via the charge transfer device 550. As shown, the charge node 530 may comprise a high-voltage power supply or "HV bus" 521, any number of contactors 522 in electrical communication with the HV bus, a charge pad 535 in electrical communication with the HV bus via one or more of the contactors, and a precharge circuit 523 also in electrical communication with the HV bus via one or more of the contactors.

Generally, the HV bus 521 is configured to be placed in electrical communication with a power distribution line 511 such that it receives power therefrom and transmits the same to the electrical components of the charge node 530. In one embodiment, the HV bus 521 allows the charge node to output power at up to about 1000V and up to about 450 kW.

The contact pad 535 of the charge node 530 is generally adapted to receive power from the HV bus 521 (e.g., via the one or more contactors 522) and to provide power to a contact pad 555 of the charge transfer device 550. To that end, the charge pad 535 may be sized/shaped to facilitate such electrical connection. For example, the charge pad 535 may comprise a large, rectangular surface area to minimize electrical contact resistance when in contact with a similarly-shaped contact pad 555.

It will be appreciated that the contact pad 535 may comprise one or more features to reduce the likelihood that debris and/or contaminants will accrue on its electrical surfaces. For example, the contact pad 535 may include one or more sloped surfaces, permeable surfaces, oleophobic surfaces, and/or hydrophobic surfaces.

The charge node 530 may comprise any number of internal contactors 522 located between the HV bus 521 and the contact pad 535 to control the electrical connection therebetween. In one specific embodiment, a contactor 522 may be in electrical communication with the contact pad 535 via a flexible cable 533 or other compliant electrical component that permits motion of the contact pad (discussed below).

In some embodiments, the charge node 530 may further comprise a precharge circuit 523 to reduce damage to components caused by elevated currents. As discussed above, a typical precharge circuit 523 may comprise a highly resistive resistor in series with a contactor 522 connected to the HV bus 521 on one end and connected to a flexible cable 533 on the other end.

As shown, the charge node 530 may comprise an MC subsystem 524 adapted to monitor parameters and control components of the charge node. As discussed above, the MC subsystem 524 may communicate with the central MC system (e.g., via an integrated or separate communications unit connected to a network) in order to identify charging vehicles, control any power conditioning components, and/or to store records of charging events and/or error logs.

For example, the MC subsystem 524 may comprise, or communicate with, an RFID transponder or other communications unit to identify a vehicle 540 requesting power. As another example, the MC subsystem 524 may be adapted to monitor electrical diagnostics (e.g., system isolation) and/or to control the contactors 522 and/or other electrical components of the charge node 530. And, in yet other embodiments, the MC subsystem 524 may monitor environmental parameters such as, but not limited to, relative humidity, liquid leaks, temperature, etc.

It will be appreciated that the charge node 530 may contain additional or alternative power electronics to transform, invert, or otherwise condition the electrical power supplied by the power distribution lines 511 for delivery to the charge transfer device 550 and vice-versa. The charge node 530 and its components may include poka-yoke features to ensure correct polarity connections.

As shown, the various electrical components of the charge node 530 may be disposed within a housing 537 to ensure such components are not damaged during reasonable use (i.e., when the charge node is embedded within a roadway 590). Generally, the housing 537 may comprise a low-profile box with height of approximately 150 mm and sloped walls.

In one embodiment, the housing may comprise a material selected from the group consisting of plastics, metals, and fiber composites. Additionally, in some embodiments, the housing may include any number of structural elements 517, such as internal walls, to prevent damage to the electrical components seated therein when a vehicle drives over the charge node, and to increase ingress protection.

In one embodiment, the housing 537 may comprise an aperture 525 to allow the contact pad 535 to connect to a contact pad 555 of a charge transfer device 550 when the charge node 530 is in use. As shown, the aperture 525 may be disposed within a top portion of the housing 537 and may be sized such that the contact pad 535 of the charge node 530 and/or the contact pad 555 of the charge transfer device 530 may extend therethrough.

In such embodiments, the housing 537 may further comprise an openable cover 538 attached to the housing, for example, via a hinge 539. The openable cover 538 may be configured to cover the aperture 525 and sealably close the housing 537 when the cover is in a closed state (e.g., when the charge node is not in use). And the openable cover 538 may be further configured to rotate about the hinge 539 in order to expose the contact pad 535 via the aperture 525 when in an open state (e.g., when the charge node is in use).

In some embodiments, the openable cover 538 may comprise a sealing material 526 on an inner surface thereof. Such sealing material 526 may provide a water-tight seal between the cover and a top portion of the housing when the cover is in a closed position. Exemplary sealing materials 526 may include, but are not limited to EPDM rubber, silicone, or a closed-cell foam.

As shown, the charge node 530 may comprise a mechanical actuator 532 adapted to extend the contact pad 535 outside the housing 537 (i.e., through the aperture 525) when the node is in use for charging. The actuator 532 may be further adapted to retract the contact pad 535 back inside the housing 537 when the charge node is not in use. Generally, the actuator 532 may be selected from the group consisting of: hydraulic actuators (e.g., pistons), pneumatic actuators, and/or electrical actuators (e.g., electric motors, solenoids etc.).

It will be appreciated that, when an extendable/retractable contact pad 535 is employed, the charge node 530 may comprise an activator 518 to activate the various system components, such as the openable cover 538, the charge pad actuator 532 and/or a safety switch (not shown). In one embodiment, the activator 518 may automatically activate such components when a sufficient downward force (e.g., the partial mass of a charging vehicle) is applied. In other embodiments, the activator 518 may be activated upon receiving an activation signal (e.g., from the MC subsystem 524).

In certain embodiments, the housing 537 of the charge node 530 may comprise any number of alignment features 536 to facilitate alignment between the contact pad 535 and the complementary contact pad 555 of the charge transfer device 550. Such alignment features 536 may provide alignment in directions parallel to the ground and/or rotational directions with axes parallel and perpendicular to the ground. Exemplary alignment features 536 may include, but are not limited to, small bumps or protrusions extending from a top surface of the housing 537 to provide tactile feedback to vehicle operators.

In another embodiment, the charge node 530 may optionally comprise one or more cleaning features 527 to prevent debris and/or liquids from accruing on electrical surfaces. A variety of techniques and designs for tackling this challenge may be employed individually or in combination, such as: pneumatic surface cleaning, hydrophobic surfaces, heating to dry water (e.g., joule heating and peltier devices), centrifugal rotation and/or a wicking layer with or without a heater. Some specific examples include, but are not limited to, brushes, wire brushes, sponges, and fans.

In certain embodiments, a compressed air cleaning system 527 may be employed to clear debris and liquids from the contactor pad 535. As an example, a tube or other air channel may be provided to direct compressed air through a nozzle or opening to create an air jet for cleaning debris or liquid water.

As another example, air may be diffused through a plurality of pores extending through the contact pad. In this case, a hydrophobic, gas-permeable barrier (e.g. GORE-TEX film) may be positioned between the air source and the top surface of the contact pad to prevent water intrusion into the air supply.

As yet another example, the air supply may be directed from one or more directions around the contact pad. In this case, the contact pad is seated in a surrounding structural material (e.g. structural polymer material) with small gaps to permit airflow around the contact pad for air delivery. Accordingly, the air may be directed about the top surface of the contact pad to aid in debris and water removal.

Additionally or alternatively, the charge node 530 may comprise a condensation management feature 519 to prevent build-up of water vapor and condensation inside the charge node housing 537. Exemplary condensation management features 519 include, but are not limited to, a hydrophobic, gas-permeable membrane (e.g., GORE-TEX film) located on a bottom surface of the housing 537.

It will be appreciated that, in certain embodiments, the charge node 530 may comprise a material or subsystem in communication with the contact pad 535 that is capable of switching the pad from being an electrical insulator to being an electrical conductor. For example, a thin film belt consisting of an electrically conducting segment (e.g., copper foil having a thickness of about 2 mm) and an electrically insulating segment (e.g. polyimide film having a similar thickness) may be bonded to each other and such component may be coupled to the housing via a mechanical system (e.g. modified conveyor belt system) capable of moving either segment into place above the contact pad. It will be further appreciated that additional or alternative means may be utilized to minimize electrical contact resistance between the conductive element and the contact pad, such as applying a normal force on the film towards the contact pad via tension in the conveyor belt system.

Still referring to FIG. 5, an exemplary charge transfer device 550 is shown mounted to a vehicle 540 and in an activated, extended state such that it may make an electrical connection between the power system 542 of the vehicle 540 and the contact pad 535 of the charge node 530. Generally, the charge transfer device may be configured to accept power at a specified voltage and to provide power to the vehicle power system at a suitable vehicle voltage. In one embodiment, the charge transfer device 550 is configured to output power at up to about 1000V and up to about 450 kW.

The charge transfer device 550 comprises various circuit components to safely, efficiently, and reliably deliver appropriate power from the charge node 530 to the vehicle power system 542. As shown, the charge transfer device 550 may comprise a HV bus 581, a primary contact pad 555 and any number of secondary contactors 582 in electrical communication with the HV bus, and, optionally, a precharge circuit 583 also in electrical communication with the HV bus via one or more of the internal contactors.

The HV bus 581 may be placed in electrical communication with the contact pad 555 such that it receives power therefrom and transmits the same to the electrical components of the charge transfer device 550. In one specific embodiment, the HV bus 581 may be in electrical communication with the primary contact pad 555 via a flexible cable 554 or other compliant electrical component that permits motion of the contactor.

The contact pad 555 of the charge transfer device 550 is generally adapted to receive power from the charge pad 535 of the charge node 530 such that the charge transfer device may provide power to the vehicle power system 542. To that end, the contact pad 555 may be sized/shaped to be complementary to the size/shape of the charge pad 535.

It will be appreciated that the contact pad 555, like the charge pad 535, may comprise one or more features to reduce the likelihood that debris and/or contaminants will accrue on its electrical surfaces. For example, the contact pad 555 may include one or more sloped surfaces, permeable surfaces, oleophobic surfaces, and/or hydrophobic surfaces.

In some embodiments, the charge transfer device 550 may further comprise a precharge circuit 583 to reduce damage to components caused by elevated currents. As discussed above, a typical precharge circuit 583 may comprise a highly resistive resistor in series with a contactor 582 connected to the HV bus 581 on one end and to a flexible cable 554 on the other end.

It will be appreciated that the charge transfer device 550 may comprise an MC subsystem 584 adapted to monitor parameters and control components of the device. The MC subsystem 584 may comprise, or communicate with, an RFID transmitter or other communications unit such that the charge transfer device may transmit a vehicle ID to the MC subsystem 524 of the charge node 530 and/or to the central MC system.

Additionally or alternatively, the MC subsystem 584 may communicate with the central MC system (e.g., via an integrated or separate communications unit connected to a network) such that it may monitor electrical diagnostics (e.g., system isolation) and/or environmental parameters, transmit records of charging events and/or error logs, and/or control various electrical components of the charge transfer device 550, such as power conditioning components and contactors.

It will be appreciated that the charge transfer device 550 may contain additional or alternative power electronics to transform, invert, or otherwise condition the electrical power supplied by the charge node 530 for delivery to the vehicle power system 542 and vice-versa. The charge transfer device 550 may include poka-yoke features to ensure correct polarity connections. With these connections the charge transfer device is capable of providing charge power to the vehicle and, optionally, providing charge power from the vehicle to the electrical grid.

In one embodiment, the various electrical components of the charge transfer device 550 may be disposed within a housing 587 to ensure such components are not damaged during reasonable use. The housing may comprise any suitable shape and/or size to allow for mounting to a surface of the vehicle 540.

As shown, the charge transfer device 550 may comprise a mechanical arm 551 having one side mounted to a surface of the vehicle 540 or the housing 587, for example, via a hinged connection 553 or the like. The other side of the arm 551 may be configured to securely hold the contact pad 555 and to extend substantially downward towards the charge node 530 when the charge transfer device is in use.

In one embodiment, the mechanical arm may be in communication with an actuator 552 that is also fixed to the vehicle 540 and/or the housing 587. The actuator 552 is generally adapted to extend the arm 551 downward such that the contact pad 555 may contact the contact pad 535 of the charge node 530 when charging. The actuator 552 is further adapted to retract the arm 551 upward when the charge transfer device 550 is not in use. In one embodiment, the actuator may be selected from the group consisting of hydraulic actuators (e.g. pistons), pneumatic actuators, and/or electrical actuators (e.g., electric motors and solenoids).

It will be appreciated that, when the extendable/retractable arm is employed, the charge transfer device 550 may comprise an activator 588 to activate the various system components, such as the actuator 552 and/or a safety switch (not shown). In one embodiment, the activator 581 may automatically activate upon receiving an activation signal from charge node 530 and/or from the MC subsystem 584.

In certain embodiments, the charge transfer device 550 may optionally comprise one or more cleaning features 556 to prevent debris and/or liquids from accruing on electrical surfaces of the charge transfer device and/or the charge node 530. As discussed above, various cleaning features may be employed individually or in combination, such as pneumatic surface cleaning, hydrophobic surfaces, heating to dry water (e.g., joule heating and peltier devices), centrifugal rotation, and/or a wicking layer with or without a heater. Some specific examples include, but are not limited to, brushes 556, wire brushes, sponges, and/or fans.

In one embodiment, the charge transfer device 550 may comprise any number of alignment features and mechanical compliance features to facilitate alignment between the contact pad 555 and the contact pad 535 of the charge node 530. Such alignment features 536 may provide alignment in directions parallel to the ground and/or rotational directions with axes parallel and perpendicular to the ground.

It will be appreciated that, in certain embodiments, the charge transfer device 550 may comprise a material or subsystem in communication with the contact pad 555 that is capable of switching the contact pad from being an electrical insulator to being an electrical conductor. For example, a thin film belt consisting of an electrically conducting segment (e.g., copper foil having a thickness of about 2 mm) and an electrically insulating segment (e.g., polyimide film having a similar thickness) may be bonded to each other and such component may be coupled to the contactor via a mechanical system (e.g., a modified conveyor belt system) capable of moving either segment into place below the contactor. It will be further appreciated that additional or alternative means may be utilized to minimize electrical contact resistance between the conductive element and the contactor, such as applying a normal force on the film towards the contact pad via tension in the conveyor belt system.

Figure 6A:
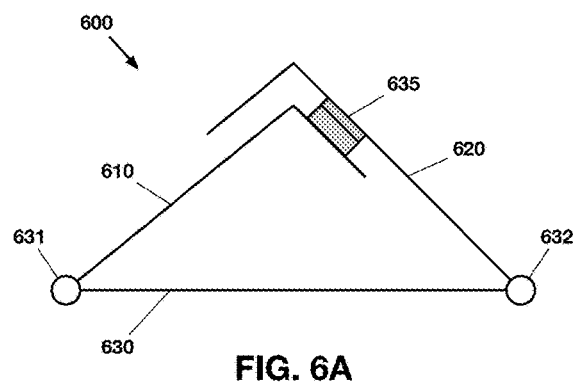
FIGS. 6A-6B show an exemplary charge node housing 600 in a closed configuration and an open configuration, respectively.
Figure 6B:
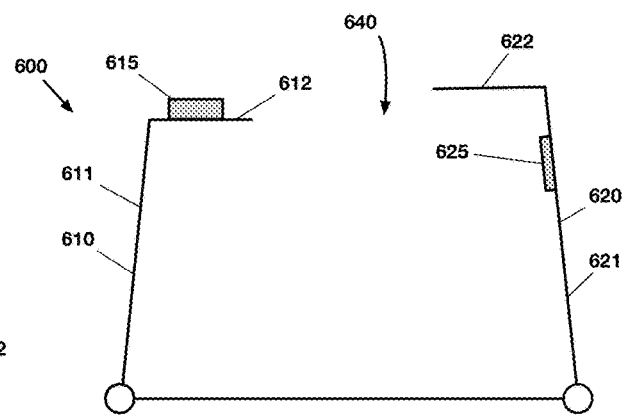

Referring to FIGS. 6A-6B, an exemplary housing 600 for an in-road charge node is illustrated in an opened and closed state, respectively. As shown, the housing 600 comprises a substantially triangular shape when closed, with two side walls 610, 620, extending upward and inward from a bottom wall 630.

In this embodiment, both of the side walls 610, 620 may comprise a lower portion 611, 621 that extends vertically away from the bottom wall 630 when the housing is in an open state. The side walls may both further comprise an upper portion 612, 622 that extends perpendicular (i.e., horizontally inward towards the center of the housing) to a top of the lower portion 611, 621. Accordingly, each of the side walls may be substantially "L"-shaped.

Generally, the lower portion 611, 621 of each side wall 610, 620 may be connected to the bottom wall 630 of the housing via a hinge 631, 632 or the like such that the side walls 610, 620 rotate inward to close the housing and outward to expose an aperture 640 in the housing. In one embodiment, one of the side walls 610 may be shorter than the other side wall 620 to allow the side walls to overlap when the walls are rotated inward to close the housing. Specifically, the shorter side wall 610 may sit within the longer side wall 620 when both side walls are rotated inward.

In one embodiment, the shorter side wall 610 may comprise a sealing material 615 on an outer surface of the upper portion 612 thereof. Similarly, the longer side 620 wall may comprise a sealing material 625 on an inner surface of the lower portion 621 thereof. Accordingly, the sealing materials 615, 625 of the side walls 610, 620 may be placed into contact when the side walls are rotated inward to thereby form a seal 635 between the upper portions 612, 622 of the side walls.

Figure 7A:
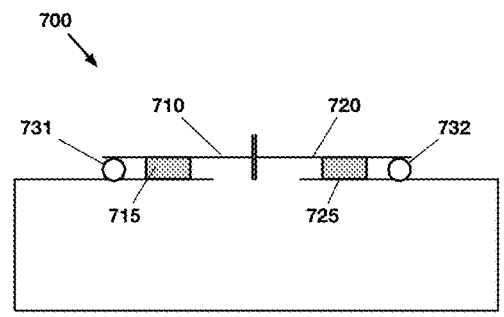
FIGS. 7A-7B show an exemplary charge node housing 700 in a closed configuration and an open configuration, respectively.
Figure 7B:
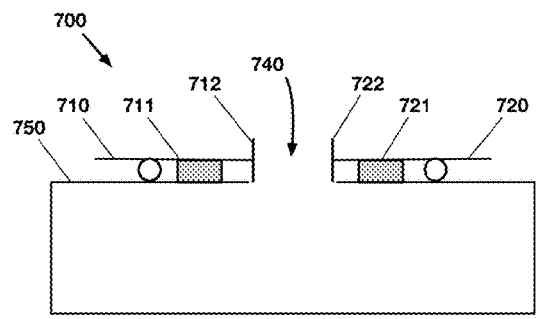

Referring to FIGS. 7A-7B, another exemplary housing 700 for an in-road charge node is illustrated in an opened and closed state, respectively. As shown, the housing 700 comprises a substantially rectangular shape with an aperture 740 extending through a top portion 750 thereof.

In this embodiment, the charge node housing 700 comprises at least one openable cover 710, 720 attached to the top portion of the housing via, for example, a mechanical system 731, 732, such as a modified conveyor belt system. In one particular embodiment, the housing may comprise two openable covers 710, 720, wherein each cover comprises a horizontal portion 711, 721 connected to a vertical portion 712, 722.

As shown, the openable cover(s) 710, 720 may be configured to move horizontally inward to cover the aperture 740 and sealably close the housing when in a closed state. And the openable cover(s) 710, 720 may be further configured to move horizontally outward in order to expose the aperture 740 when in an open state.

In some embodiments, the covers 710, 720 may comprise a sealing material 715, 725 located between a bottom surface thereof and the top portion of the housing 750. Although not shown, the vertical portion 712, 722 of each cover 710, 720 may additionally include a sealing material disposed on an inner surface thereof.

Figure 8:
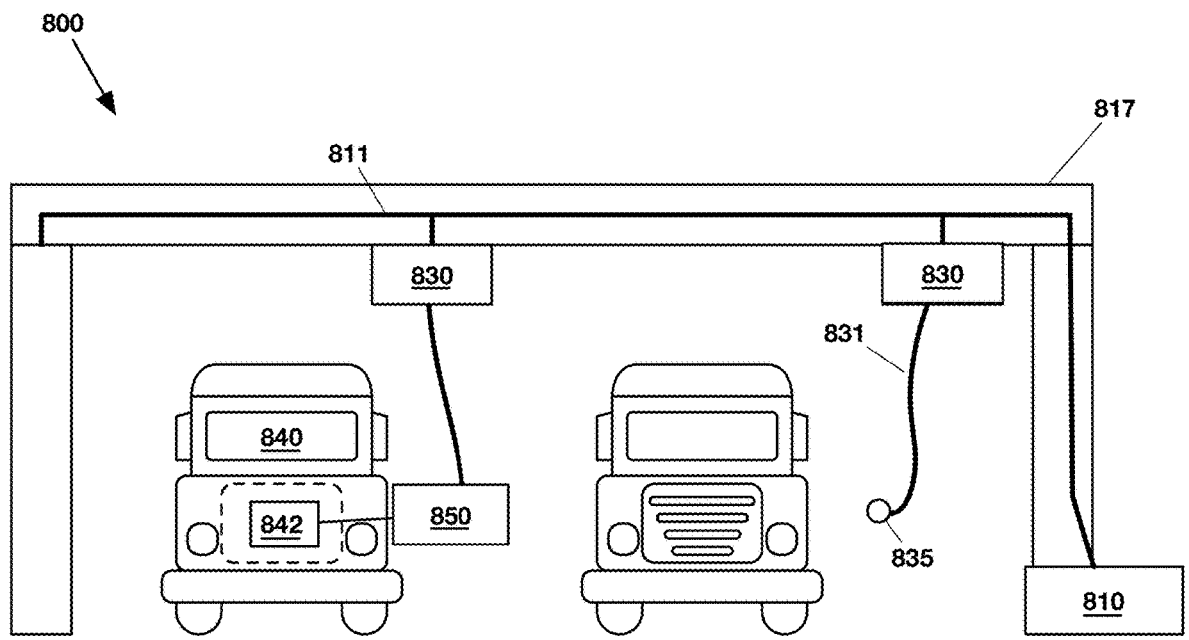
FIG. 8 shows an exemplary overhead charging system 800 comprising one or more charge nodes 830 located above one or more vehicles 840.

Referring to FIG. 8, an exemplary charging system 800 is illustrated wherein power is delivered to the power system 842 of a vehicle 840 via a charge node 830 located above ground.

As shown, the system 800 comprises a charge node 830 in electrical communication with a power transformation module 810 via one or more overhead power distribution lines 811. Such power distribution lines 811 may be made out of copper or aluminum alloys with appropriate electrical insulation, electromagnetic shielding, weather protection, UV protection, and damage protection.

In one embodiment, the overhead power distribution lines 811 transmit electrical energy above ground at a height that is safely out of reach of personnel and moving equipment (e.g., large trucks, tractors, forklifts, cranes, and/or inspection equipment). To that end, the overhead power distribution lines 811 may be supported by a support structure 817, such as mechanical truss or beam extending from posts and/or any other structure(s) (e.g., buildings).

In one embodiment, the overhead power distribution lines 811 may be thermally managed using a liquid cooling system, such as jacketed power lines, using conductive, convective, or radiative cooling such as heat sinks or fin heat exchangers, and/or using a refrigeration system. Moreover, in some embodiments, the overhead power distribution lines may include any number of safety features, such as warning lights, warning auditory alarms, system-ok signals, and fault detection systems.

In any event, the power distribution lines 811 may be in electrical communication with any number of overhead charge nodes 830. Like the in-road embodiments discussed above, the overhead charge nodes 830 are adapted to transmit power from the power distribution lines 811 to a charge transfer device 850. Accordingly, such charge nodes may comprise some or all of the above-discussed components of the in-road charge nodes.

In certain embodiments, the overhead charge nodes 830 may each comprise a manual plug 831 with a connector 835 that hangs down from the support structure 817. The manual plug 831 may be chosen to maximize compatibility with vehicles, and more than one plug type can hang down to permit compatibility with different vehicles. It will be appreciated that the overhead charge node 830 may be fully compliant with the SAE J3105 standard for overhead vehicle charging.

In some embodiments, the charge transfer device 850 may be fixed to a vehicle 840 and in electrical communication with the vehicle's power system 842. Accordingly, the charge node 830 may transfer power received from the power transformation module 810 to the charge transfer device 850, and the charge transfer device 850 may transfer the power to the vehicle's power system 842 to thereby charge the vehicle 840.

It will be appreciated that, like the charge nodes 830, the charge transfer devices 850 may be fully compliant with the SAE J3105 standard for overhead vehicle charging. It will be further appreciated that, in cases where the overhead charge node 830 employs a manual plug that directly connects to an existing plug port on a vehicle, the charge transfer device 850 may not be necessary.

Referring to FIG. 9, an exemplary charging system comprising an electrified track system 900 is illustrated. As shown, the electrified track system may comprise one or two tracks 901 mounted to a roadway 990 such that a vehicle 940 may travel along the tracks to receive a charge therefrom.

In one embodiment, the track system 900 may be in electrical communication with a power transformation module 910 receiving power from a power supply (not shown). As discussed in detail below with respect to FIGS. 11-12, each track 901 includes a primary conductor in electrical communication with the power transformation module 910 and disposed within a flexible, non-conductive housing. The tracks 901 further comprise one or more secondary conductors 935 that are at least partially disposed along a surface of the track. That is, the secondary conductor(s) 935 extends from a position inside the flexible housing to a position outside the flexible housing. Accordingly, the secondary conductor(s) 935 may contact the primary conductor to receive power therefrom, and a conductor 955 of a charge transfer device 950 may then contact the charged secondary conductor 935 to receive such power.

Generally, the tracks 901 are configured such that the secondary conductor 935 does not contact the primary conductor unless an activation condition is present. In one embodiment, the activation condition relates to a sufficient downward force being exerted on the flexible housing. For example, the tracks 901 may be configured such that the secondary conductor 935 makes electrical contact with the primary conductor only when a mass of at least about 500 lbs, at least about 600 lbs or at least about 700 lbs is present on a top surface of the track housing.

In other embodiments, the activation condition may relate to the presence of a charge transfer device 950. For example, an electromagnetic coil in the charge transfer device may create an attractive force towards magnetic or ferromagnetic components mounted to the primary conductor. Accordingly, in the presence of the electromagnetic coil of the charge transfer device, the primary conductor may move within the housing to contact the secondary conductor and thereby energize the track.

As another example, the primary and secondary conductors may be separated by an electrically insulating material and may further be mechanically predisposed towards each other such that, if the electrically insulating material is removed, they will come into contact. In this case, the electrically insulating material may be actuated by the charge transfer device via mechanical forces or electromagnetic forces, thus energizing the track. The electrically insulating material may automatically be reset between the primary and secondary conductors when the charge transfer device is no longer present.

It will be appreciated that a human may safely walk along the tracks without fear of being electrocuted, because: (1) the housing is non-conductive, (2) the charged primary conductor is safely housed inside the housing, (3) the secondary conductor does not contact the primary conductor (or any other charged component) in the absence of an activation condition, and (4) the activation condition is selected such that it may not be satisfied by a human simply walking along the track.

As shown in FIG. 9, a charge transfer device 950 may be mounted to the vehicle 940 to make an electrical connection to an exposed secondary conductor 935 of a track 901. As explained above, the charge transfer device 950 may be in electrical communication with a power system 942 of the vehicle 940 such that the device may transmit charge from the track system 900 to the vehicle. It will be appreciated that the charge transfer device of this embodiment may comprise some or all of the features discussed above with respect to charge transfer device 550 shown in FIG. 5.

In one embodiment, the conductor 955 of the charge transfer device 950 may comprise a wheel or other rotating member made of an electrically-conductive material. Accordingly, the rotating conductor 955 may roll along the secondary conductor(s) 935 of the track 901 to receive charge therefrom, without getting stuck in any gaps present between the secondary conductors.

Although not shown, the charge transfer device 950 may further comprise mechanical features, such as spring and/or other damping features, to ensure solid contact between the conductor 955 and the secondary conductor 935.

In one embodiment, an auxiliary dynamic charging device 960 may be employed to receive power from the track system 900. Generally, such device 960 may comprise any number of energy storage devices 961 to provide additional energy storage to the vehicle 940 and/or to reduce fluctuations in supply power thereto. Additionally or alternatively, such device 960 may comprise one or more energy generation devices 962 to provide additional power to the vehicle 940 and/or to reduce fluctuations in supply power to the vehicle.

In one embodiment, the auxiliary dynamic charging device 960 houses one or more lithium-ion batteries with a battery management system designed for the expected power rates experienced during operation. In another embodiment, the auxiliary dynamic charging device contains ultracapacitors and appropriate power electronics. In yet another embodiment, the auxiliary dynamic charging device contains a mechanical flywheel. And, in another embodiment, the auxiliary dynamic charging device 960 contains a fuel cell and fuel storage, such as a hydrogen fuel cell and a compressed hydrogen gas tank.

When employed, the auxiliary dynamic charging device 960 is electrically connected to the vehicle 940. For example, an electric power line 912 or the like may provide electrical connectivity between the auxiliary device 960 and a power system 942 of the vehicle 940.

It will be appreciated that the auxiliary dynamic charging device 960 may interact with the track system in similar fashion to the vehicle 940. That is, the device 960 may comprise any number of wheels/tires that apply a downward force on the secondary conductor(s) 935 of the track system to thereby cause the system to activate. Moreover, the auxiliary device 960 may be in communication with a charge transfer device 950 such that the charge transfer device receives charge from the activated secondary conductor(s) 935 and provides the same to the auxiliary device 960 (e.g., via connection to one of the energy storage devices 961 contained within the auxiliary device or via connection to an integrated power system).

In one embodiment, the auxiliary dynamic charging device 960 may be mechanically connected to the vehicle 940. For example, the device 960 may be connected to the vehicle 940 via a hitch or mechanical arm. Alternatively, the auxiliary dynamic charging device 960 may comprise motors and, optionally, various proximity sensors such that it may propel itself along the track(s) 901 while maintaining proximity to the electric vehicle 940.

Referring to FIGS. 10A-10C, top views of exemplary tracks for use in a track system (e.g., FIG. 9 at 900) are illustrated. FIG. 10A shows a track system comprising two tracks 1011, 1021, wherein each track comprises a plurality of secondary conductors (e.g., 1034-1037). FIG. 10B shows a track system comprising two tracks 1012, 1022, wherein each track comprises a single secondary conductor 1032, 1038. And FIG. 10C shows a track system comprising a single dual-polarity track 1013 having both a positively charged secondary conductor 1033 and a negatively charged secondary conductor 1039.

Referring to FIG. 10A, a track system comprising two tracks 1011, 1021 is shown, wherein each track comprises a plurality of secondary conductors 1031, 1035. Generally, two tracks may be provided such that one track 1021 includes positively charged secondary conductors 1034-1037 and the other track 1011 includes negatively charged secondary conductors 1031.

In this embodiment, each track (e.g., track 1021) may comprise a polymer tube housing 1080 mounted to a roadway, a primary electrical conductor extending within the housing, and a series of secondary electrical conductors 1034-1037 that extend laterally from an inside of the housing to an outside thereof. As discussed in detail below, each of the secondary conductors 1034-1037 may be isolated from the primary electrical conductor until a sufficient downward force is applied to a top surface of the housing. For example, a tire 1099 of vehicle may travel on the polymer tube housing 1080 of a track 1021, causing a top surface of the track's housing to deform under the tire, which brings a secondary conductor 1034 into contact with the primary conductor to thereby activate the secondary conductor.

In one such embodiment, each of the secondary conductors 1034-1037 may be isolated from the others. Accordingly, a given secondary conductor 1034 may activate in the presence of a localized downward force (e.g., vehicle tires 1099), while the other secondary conductors 1035-1037 remain inactive.

It will be appreciated that the width of the track 1021 directly influences the amount of tire 1099 that contacts the flexible housing 1080. In some cases, the track 1021 may comprise a narrow width such that the tire-to-roadway traction is increased, which reduces the need for the track system to react to acceleration and deceleration forces from the tire. As discussed below in reference to FIGS. 13-14, the track housing 1080 may comprise additional height to compensate for decreased width.

In embodiments in which the secondary electrical conductor 1034 is energized by weight from the vehicle transmitted by one or more vehicle tires 1099, the proximity of the vehicle tires to a charge transfer device (see FIG. 9 at 950) influences the fraction of time the secondary electrical conductor 1034 is energized and charge is being transferred to the vehicle. Other factors influencing the fraction of time the secondary electrical conductor 1034 is energized may include the gaps between secondary conductors, the length of the secondary conductors, the velocity of the vehicle, the starting point of the vehicle, and various electrical connection times.

Safety considerations may also influence the spacing and length of secondary conductors. If secondary conductors 1034 are sufficiently long, they will extend outside the footprint of the vehicle tire 1099, possibly posing a safety hazard to nearby personnel and a risk of damage to nearby equipment.

In one embodiment, the track may comprise a total width of from about 75 mm to about 700 mm (e.g., about 400 mm). The width of the track that is available to be contacted by a tire may be from about 50 mm to about 650 mm (e.g., about 330 mm), as measured from the left side of a track (e.g., 1021) to the left side of the secondary conductors (e.g., 1034) in FIG. 10A.

It will be appreciated that the length of each secondary conductor 1034-1037 may vary. However, each secondary conductor will typically comprise a length of from about 1.5 m to about 20 m (e.g., about 3 m).

As further shown in FIG. 10A, the tracks (e.g., track 1021) may comprise one or more output units 1071, 1072 to provide alerts and other notifications to drivers, system operators and/or pedestrians. For example, one or more output units 1071 may activate when a particular secondary conductor 1034 located within a track 1021 is energized. As another example, one or more output units may activate when any secondary conductor located within a track (or a segment of a track) is energized.

Such output units 1071 may comprise, for example, audio output transducers (e.g., speakers or buzzers) and/or visual output transducers (e.g., lights, LEDS, displays, etc.). For example, a small LED may be installed next to each secondary conductor segment. As another example, numerous LEDs may be coupled to fiber optic lines running throughout a track.

It will be appreciated that each of the one or more output units 1071, 1072 may be in communication with a sensor located inside or outside the track housing (discussed below). Moreover, it will be appreciated that the output units may be powered via photovoltaic cells, batteries, and/or a connection to the main power line (e.g., using appropriate power electronics such as a step-down transformer).

Referring to FIG. 10B, a track system comprising two tracks 1012, 1022 is shown, wherein each track comprises a single secondary conductor 1032, 1038. As discussed in detail below with respect to FIGS. 16-17, in some embodiments, each track (e.g., 1022) may comprise a plurality of segments 1041, 1042 connected in series via one or more connectors 1070. Such configuration may allow the tracks to be rapidly and reliably assembled during deployment.

Referring to FIG. 10C, a track system comprising a single, dual-polarity track 1013 is shown. In this embodiment, both a negatively charged secondary conductor 1033 and a positively charged conductor 1039 may be housed within a single housing. As discussed in detail below with respect to FIG. 15, this embodiment may include a negatively charged primary conductor and a positively charged primary conductor seated within a single housing and extending along the length of the track. In one case, the secondary conductors 1033, 1039 may be mechanically coupled together such that, when one activation condition is satisfied (e.g., a vehicle tire contacts the housing), both secondary conductors contact the respective primary conductors to thereby activate. In another case, such as the embodiment shown in FIG. 15, the secondary conductors 1033, 1039 may each be subject to a separate activation condition.

It will be appreciated that all of the above-discussed tracks may be adapted to withstand various environmental conditions. For example, the tracks may be weatherproof such that the system may operate in the presence of snow, ice, water, typical outdoor solvents, and/or road salts. As another example, the tracks may manage their own thermal expansion with respect to a mounted surface and other system components.

Figure 11:
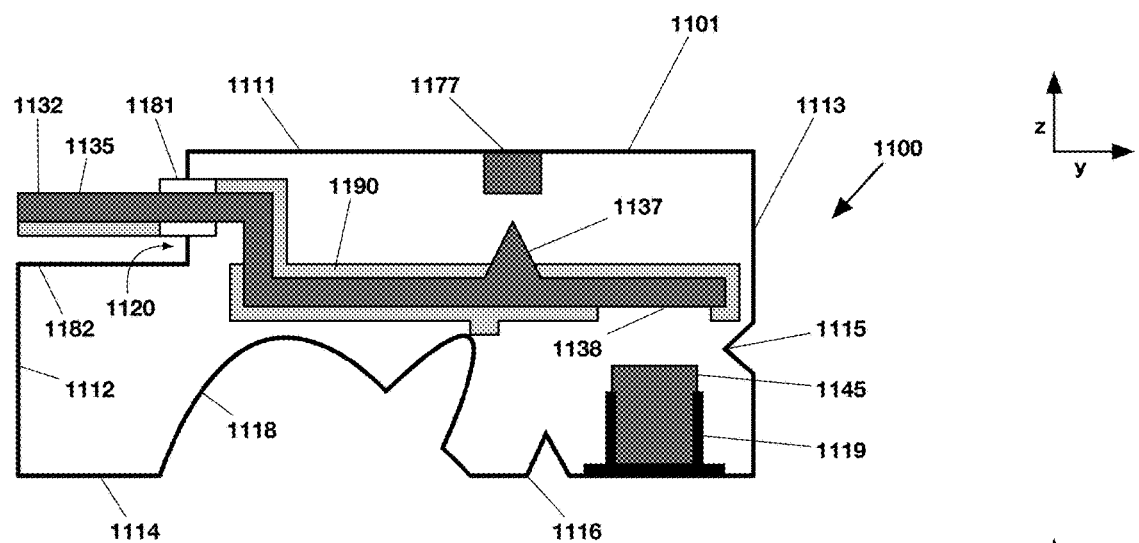
FIG. 11 shows a cross-sectional view of an exemplary track 1100 in an inactive state.

Referring to FIG. 11, a cross-section of an exemplary track 1100 in an open-circuit configuration is illustrated. As shown, the exemplary track comprises a primary electrical conductor 1145 and a secondary electrical conductor 1135 disposed within a housing 1101. Such embodiments are depicted in an open-circuit configuration because the primary conductor 1145 is not in electrical communication with the secondary conductor 1135.

Generally, the primary conductor 1145 may be made of a suitable conductive material, such as copper or aluminum single wire or multiwire, single film or multilayer film. The primary conductor 1145 may comprise any suitable size/shape (as long as it can be securely positioned within the housing), comprises any required electrical properties, and can be configured to contact the secondary conductor 1135 only when a suitable downward force is present.

In some embodiments, the primary conductor 1145 may be coated to enhance mechanical properties, electrical properties, corrosion resistance, and/or adhesion to a polymer insulator. In one such embodiment, the primary conductor 1145 may be electrically insulated with, for example, a polymer casing 1119 that is stripped, removed, or otherwise not present along a surface where electrical contact will be made with the secondary conductor 1135 (e.g., a top surface).

Generally, the secondary conductor 1135 may be shaped and/or sized such that: (1) a first end 1132 of the secondary conductor extends outward through an aperture 1120 in the housing 1101; (2) the first end 1132 is complementary to a contactor of a charge transfer device; (3) a second end 1138 of the conductor is capable of making electrical contact with the primary conductor in the presence of a sufficient downward force; (4) the second end is complementary to the primary conductor 1145; and (5) the secondary conductor comprises an adequate surface area to conduct necessary electrical charge without overheating or failing. As shown in FIG. 11, an exemplary secondary conductor may comprise substantially parallel first 1132 and second 1138 end portions connected via a substantially perpendicular middle portion. It will be appreciated that such configuration is merely exemplary and various other configurations may be employed as desired or required.

Like the primary conductor 1145, the secondary conductor 1135 may comprise a suitable conductive material, such as copper or aluminum single wire or multiwire, single film or multilayer film. Moreover, the secondary conductor 1135 may also be coated to enhance mechanical properties, electrical properties, corrosion resistance, or adhesion to a polymer insulator. For example, the secondary conductor 1135 may be electrically insulated with a polymer casing 1190 that is stripped, removed, or otherwise not present in the location where electrical contact will be made with the charge transfer device (i.e., the first end 1132) or the primary conductor 1145 (i.e., the second end 1138).

In certain embodiments, the secondary conductor 1135 may comprise features, coatings, or films to enhance sealing at the interface between the housing 1101 and the secondary conductor. For example, a multilayer polypropylene 1181 material may be heat-bonded to the secondary conductor 1135 and then bonded or heat-sealed to a polymer tube housing during fabrication of the track. This is similar to tab sealing in pouch battery cells. Alternately, arc coronation may be employed to improve sealing on this interface.

Additionally or alternatively, the secondary conductor 1135 may comprise one or more features that are either electrically conducting or electrically insulating and that are mechanically coupled to the polymer casing to control the actuation of the secondary conductor in response to a force applied to the track. The secondary conductor may further comprise features that facilitate coupling to a fault detection wire or device, such as a mounting hole for a fastener or a region of high curvature of radius 1137 to electromagnetically interact with an electromagnetic sensor 1177, such as a hall effect sensor or the like.

Although not shown, it will be appreciated that the track system may comprise a third electrical conductor that may be placed in electrical communication with the secondary electrical conductor 1135. The third conductor may also be in electrical communication with other system components, such as an MC module (not shown), in order to provide a voltage signal to such components. Accordingly, the third conductor allows for an external system (e.g., the MC system) to detect when the secondary conductor 1135 is energized.

It will be appreciated that the third electrical conductor may be mounted inside or outside the housing 1101. In one embodiment, the third electrical conductor may be mounted to an inner surface of the housing such that the third conductor may only contact the secondary conductor when the housing is compressed and the secondary conductor is powered. In other embodiments, the third electrical conductor may be mounted at another location inside or outside the housing and may be electrically coupled to the secondary conductor 1135 via a wire or the like.

As shown in FIG. 11, the track system housing 1101 may comprise a substantially rectangular shape, with a top wall 1111 connected to a bottom wall 1114 via two side walls 1112, 1113. The housing 1101 may comprise a flexible, protective material, such as a polymer tube, configured to compress or deform under the weight of a vehicle parked on, or moving slowly along, a top surface thereof. Generally, the housing may be designed such that the compression results in an electrical connection between the primary conductor 1145 and a proximate secondary conductor 1135 to thereby energize the secondary conductor.

The housing 1101 may be designed to experience the full weight of a vehicle or a fraction thereof to create electrical conduction between the primary 1145 and secondary conductor 1135, due to distribution of the vehicle total weight on its various wheels, variations in vehicle total weight, and distributions of vehicle weight on the track system and the roadway.

It will be appreciated that the width of the housing 1101 directly influences the amount of vehicle tire that may contact the housing. The width of the housing may therefore be designed to be small to increase the vehicle's tire-to-roadway traction. Such configuration reduces the need for the track system to react to acceleration and deceleration forces exerted by the truck.

As shown, the housing 1101 may comprise various structural features along one or more surfaces thereof. In one embodiment, the housing 1101 may comprise one or more features to enhance creepage protection (i.e., electrical isolation) of the primary conductor 1145. For example, the housing may include a small indentation 1115 within a side wall 1112 at a location that is slightly above a top surface of the primary conductor 1145.

In another embodiment, the housing 1101 may comprise one or more features to secure the primary conductor 1145 in a certain location/orientation within the housing. For example, the housing may comprise an indentation 1116 in a bottom wall 1114 thereof, at a location adjacent to the primary conductor. As another example, an insulating material 1119 may be disposed along a bottom surface of the primary conductor 1145 and such material may be bonded or fastened to the bottom wall 1114 of the housing 1101. Accordingly, such features may prevent the primary conductor 1145 from moving laterally within the housing.

Generally, the housing 1101 may comprise one or more features to correctly position the secondary conductor 1135 such that it does not contact the primary conductor 1145 unless a minimum downward force is applied. Such features may be further adapted to mechanically guide the secondary conductor 1135 toward the primary conductor 1145, such that the two electrodes make electrical contact in the presence of the required downward force. As an example, a portion 1118 of the bottom wall 1114 of the housing 1101 may be curved inward to prevent the secondary conductor 1135 from contacting the primary conductor 1145 until a sufficient downward force is applied. As another example, a portion of the left side wall 1112 of the housing 1101 may project inward to thereby create a substantially flat ledge portion 1182 where the secondary conductor extends outward from an aperture 1120 in the housing. Accordingly, such feature may support a first end 1132 of the secondary conductor 1135 and may prevent a second end 1138 thereof from rotating upward and away from the primary conductor 1145 when a downward force is applied to the first end.

In one embodiment, the housing 1101 may comprise one or more features to enable it to be securely mounted to a roadway. For example, the housing may comprise reinforced, pass-through apertures, grooves and/or protrusions that enable fasteners to secure the track to the roadway. Such features may be reinforced by, for example, metal inserts, plastic inserts, ceramic inserts, wire reinforcement and/or fiber reinforcement. In another embodiment, the housing may comprise features that facilitate adhesion or bonding of the track to the roadway, especially using materials that are favorably bond with concrete and asphalt.

Additionally or alternatively, the housing 1101 may comprise features that facilitate removal of the track system from the roadway. For example, the housing may comprise any number of pull tabs, reinforced hoist locations, sacrificial layers that can be removed and/or others.

In yet other embodiments, the housing 1101 may include one or more features to indicate water ingress and/or tampering. Water ingress detection may be achieved using a material that reacts in the presence of water. Tamper indication may be achieved using adhesives or stickers that contain unique features that are difficult to repair or replace.

As discussed below in reference to FIGS. 16-17, the housing 1101 may comprise a sealing feature to enhance the seal where the secondary conductor 1135 extends laterally outward from an interior of the housing (e.g., through an aperture 1120). Exemplary sealing features may include, but are not limited to, geometric shapes that enhance sealing, surface treatments such as arc coronation, adhesives, epoxies, and/or RTV sealants. It will be appreciated that the shape of the housing and secondary conductor may be selected to apply normal pressure to the sealing surface when the weight of a vehicle weight is applied to the track system, which also enhances sealing.

It will be appreciated that the polymer tube housing 1101 may comprise any number of layers, such as an outer protective layer and one or more inner layers. Generally, the outer layer may provide mechanical compliance and protection for electrical components disposed within the housing, while the one or more inner layers may provide weatherproofing, electrical isolation, fault detection, electromagnetic shielding, damage resistance, and/or ingress protection.

In one embodiment, the housing 1101 comprises an inner layer adapted to provide electromagnetic shielding. For example, the inner layer may comprise one or more of the group consisting of: metallic meshes, metallic wires, thin foils and other electrically conductive wraps. Such components may be connected to an electrical ground to provide shielding.

In another embodiment, the housing comprises an inner layer adapted to provide electrical isolation. For example, the inner layer may comprise one or more electrically insulating materials, such as rubber, KAPTON, ceramic coatings, and/or other polymeric materials.

In yet another embodiment, the housing 1101 comprises an inner layer adapted to provide weatherproofing. For example, the inner layer may comprise one or more polymeric materials, such as polyethylene, polypropylene, rubber, and/or KAPTON. As another example, the inner layer may comprise one or more thin metals, such as aluminum or copper foils. It will be appreciated that, in the latter case, such thin metals may additionally or alternatively provide fault detection features.

In one embodiment, the polymer tube housing 1101 may be designed as an extrusion process with a custom process for inserting each discrete secondary conductor during extrusion or after extrusion. Generally, the primary conductor, other conductors and/or the various secondary layers (e.g., electromagnetic shielding), may similarly be added into the polymer tube after extrusion.

In some cases, the numerous secondary conductors may be attached to each other in an initial process using an electrically insulating material. Such process may result in the creation of a long part having multiple isolated secondary conductors. This part may then be integrated into the extrusion process of the polymer tube as a co-extrusion or similar process.

The track system may be designed as a long roll (e.g. greater 50 ft) that can be unrolled for deployment on site. To enable rolling, the secondary conductor may be designed to be flexible to meet the curvature requirements for rolling. Such flexibility may be achieved by minimizing the thickness of the secondary conductor(s) in the direction normal to the curvature imposed by winding. Additionally or alternatively, the secondary conductor materials may be selected for compliance (e.g., ductile grade of copper), and multiple layers or strands of metal welded, fused, or otherwise bonded in discrete locations may be employed to simultaneously enable electrical conductivity and mechanical compliance.

The track segments and all secondary conductors may be integrated into the rolled track system before deployment. This may require end caps (i.e., connectors) on all segments to be mounted and connected before the track system is rolled up. Alternately, the track system may comprise a plurality of individual track segments that can be connected during installation. It will be appreciated that end caps/connectors may generally be added during assembly of the track segments in a manufacturing facility or during deployment at the deployment site.

Figure 12:
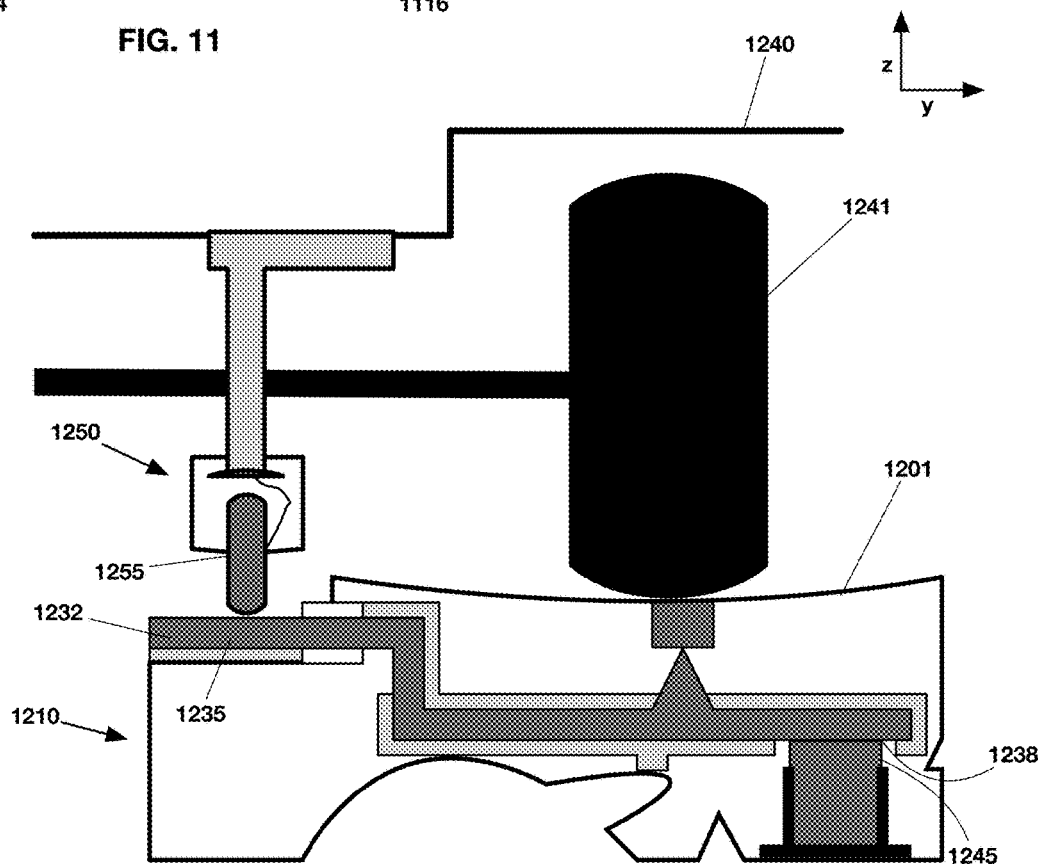
FIG. 12 shows a cross-sectional view of an exemplary track 1210, wherein a vehicle is positioned above the track to thereby cause the system to activate.

Referring to FIG. 12, a cross-section of an exemplary track 1210 in a closed-circuit configuration is illustrated. As shown, the housing 1201 of the track 1210 is deformed/compressed under the downward force exerted on the housing by a tire 1241 of a vehicle 1240. As a result, an electrical connection is established between the primary conductor 1245 and the secondary conductor 1235 (e.g., the second end 1238 of the secondary conductor).

In such embodiment, the secondary conductor 1235 receives power from the primary conductor 1245 and transmits the same to any conductive components that are electrically connected thereto. Accordingly, in the illustrated embodiment, the secondary conductor 1235 transmits the charge to a conductor 1255 of a charge transfer device 1250 via a first end 1232 that is in contact with the conductor 1255. In turn, the charge transfer device may provide the received charge to a power system of the vehicle to which the device is attached.

Figure 14:
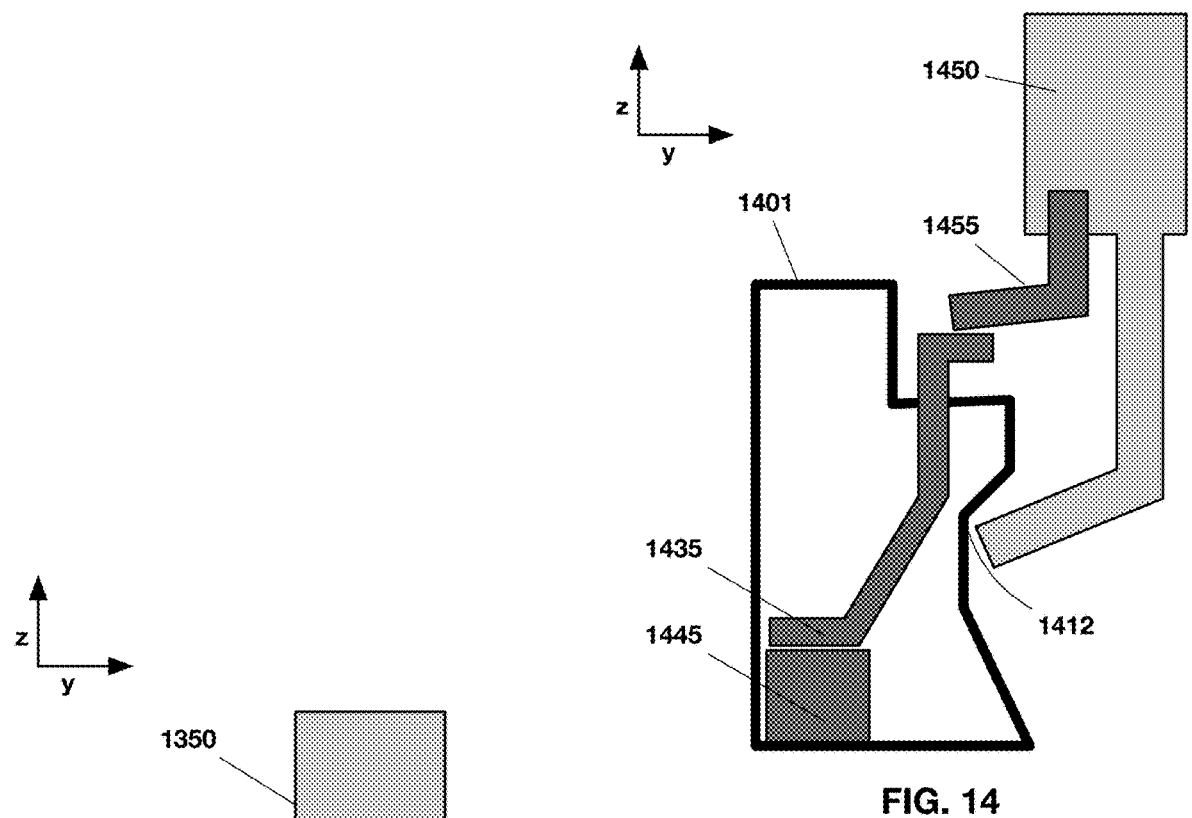
FIG. 14 shows a cross-sectional view of an exemplary track and charge transfer device.
Figure 13:
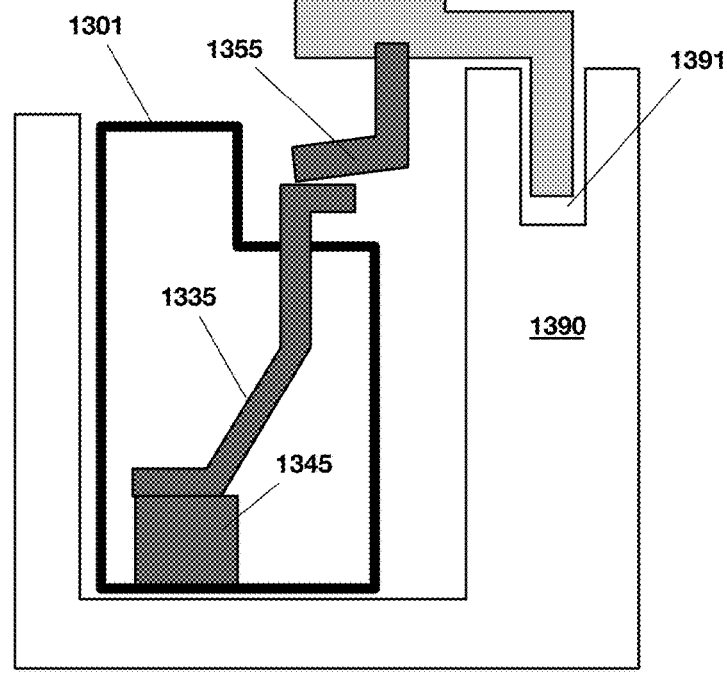
FIG. 13 shows a cross-sectional view of an exemplary track and charge transfer device.

Referring to FIGS. 13-14, cross sections of exemplary narrow-width track systems in closed-circuit configurations are illustrated. As shown, the systems each comprise a narrow housing 1301, 1401, such as a polymer tube, in which a primary conductor 1345, 1445, is disposed. The systems are further shown to comprise a secondary conductor 1335, 1435 in electrical communication with both the primary conductor 1345, 1445 and a conductor 1355, 1455 of a charge transfer device 1350, 1450.

It will be appreciated that the width of the housing directly influences the amount of vehicle tire that may contact the housing. Accordingly, in some embodiments, the housing may be configured to comprise a relatively narrow width in order to increase the tire-to-roadway traction of a vehicle. In turn, such configuration reduces the need for the track system to react to acceleration and deceleration forces exerted by the vehicle.

As shown in FIGS. 13-14, narrow-width embodiments may comprise various features to facilitate electrical connections between the secondary conductor and the charge transfer device. For example, additional height may be added to the housing 1301, 1401 to accommodate the narrower width.

As another example, one or more guiding features (e.g., 1391), such as grooves or the like, may be cut into the roadway 1390 and/or otherwise added to the track system in order to mechanically guide an electrical contact device 1350 towards the secondary conductor 1335 to ensure solid contact.

In one embodiment, the polymer tube housing 1401 may be configured to contain features that help the charge transfer device 1450 register its location with respect to the secondary conductor 1435 (e.g., by means of mechanical, visual, or electromagnetic proximity). For example, as shown in FIG. 14, the polymer tube housing 1401 may be configured to include one or more projections or grooves 1412 to facilitate the charge transfer device in determining mechanical proximity. As another example, electromechanical proximity sensing may be achieved by magnets or conductive wires that can be sensed by devices such as hall effect sensors.

Figure 15:
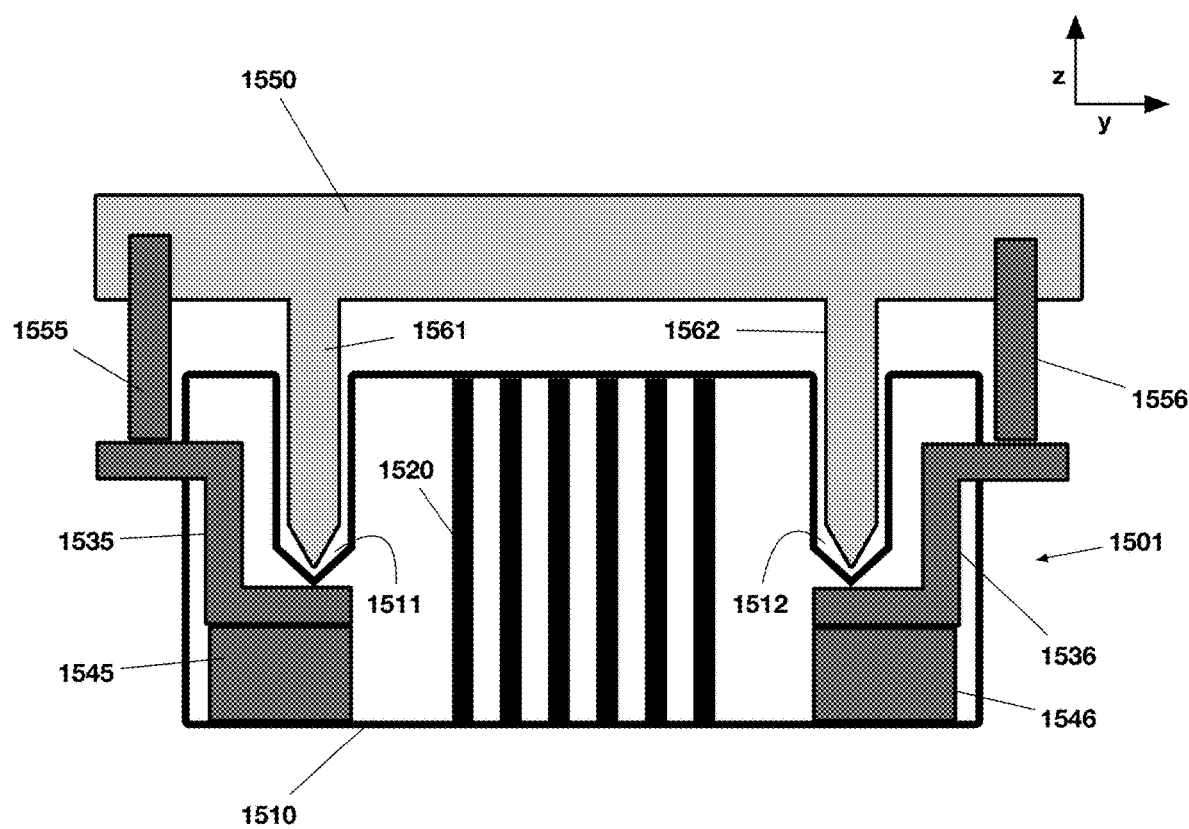
FIG. 15 shows a cross-sectional view of another alternative embodiment of the track system.

Referring to FIG. 15, a cross-sectional view of an exemplary track 1501 and an exemplary charge transfer device 1550 is illustrated. As shown, the track 1501 comprises a positively charged primary conductor 1545 and a negatively charged primary conductor 1546 disposed within a flexible housing 1510, such as a polymer tube. The track further comprises a first secondary conductor 1535 and a second secondary conductor 1536, wherein both secondary conductors extend from within the housing 1510 to an exterior thereof.

As shown, a top surface of the housing 1510 may comprise grooves or indentations 1511, 1512 sized to receive complementary activation features 1561, 1562 of a charge transfer device 1550. Generally, the activation features 1561, 1562 of the charge transfer device 1550 may apply a force to the secondary conductors 1535, 1536 to cause the secondary conductors to contact the primary conductors 1545 and 1546, respectively, and thereby activate the track.

In one embodiment, the activation features 1561, 1562 may employ apply a downward force via mechanical engagement with the grooves 1511, 1512. For example, the activation features 1561, 1562 may simply comprise projections or other structural elements that transfer the partial weight of a vehicle (not shown) 1550 downward in order to push the secondary conductors 1535, 1545 towards the primary conductors 1545, 1546.

Alternatively, the activation features 1561, 1562 may not employ the weight of a vehicle to transfer downward force. Rather, such force may be generated via some other means, such as springs, motors, and/or pistons. In such cases, the charge transfer device 1550 may optionally comprise features to enable upward actuation of the activation features 1561, 1562 to release contact with the electrified track.

In other embodiments, the activation features 1561, 1562 may employ non-mechanical means to activate the track. For example, the activation features 1561, 1562 may employ electromagnetic coils to move the secondary conductors 1535, 1536 and/or primary conductors 1545, 1546 together.

It will be appreciated that the specific and complementary sizing of the mechanical activation features 1561, 1562 and indentations 1561, 1562 reduces the likelihood of unintentional energizing of the secondary conductors 1535, 1536. It will be further appreciated that the housing may comprise structural features 1520, such as ribbing or the like, to increase structural rigidity in a center region thereof.

In any event, the charge transfer device 1550 may further comprise a first conductor 1555 adapted to contact the first secondary conductor 1535 of the track 1501, and a second conductor 1556 adapted to contact the second secondary conductor 1536 of the track. Accordingly, the conductors 1555, 1556 of the charge transfer device 1550 may receive power from the secondary conductors 1535, 1536 of the track when the track is activated (i.e., when the secondary conductors are both in contact with a respective primary conductor 1545, 1546).

Figure 16:
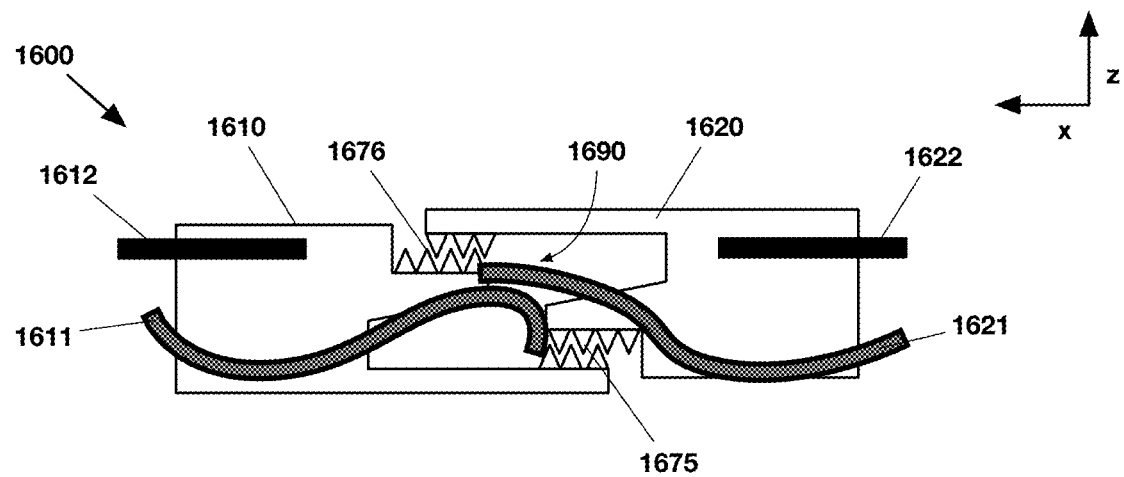
FIG. 16 shows a cross-sectional view of a track connector according to an embodiment.
Figure 17:
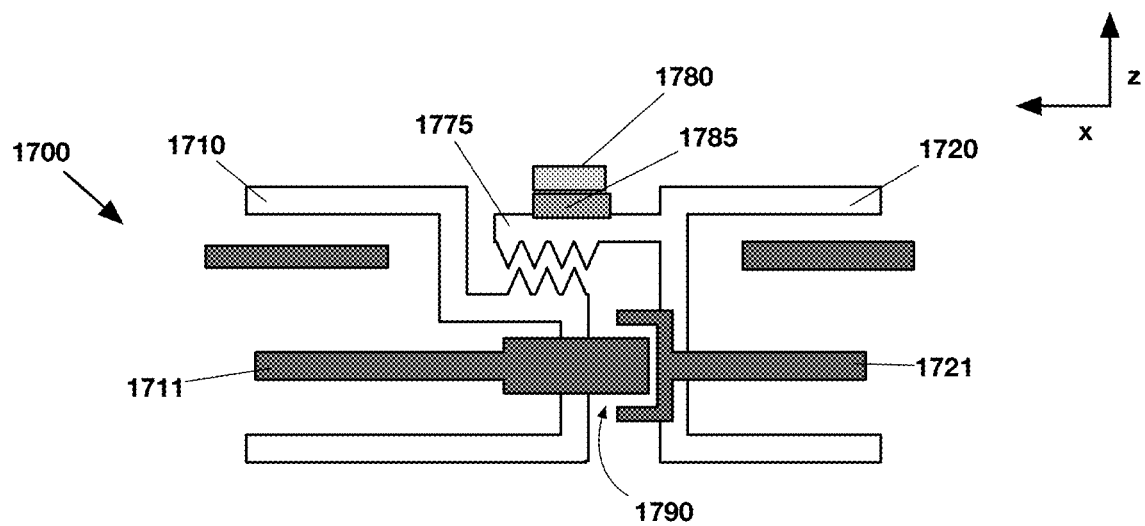
FIG. 17 shows a cross-sectional view of a track connector according to an alternative embodiment.

Referring to FIGS. 16 and 17, cross-sectional views of exemplary track connectors 1600, 1700 are illustrated. As discussed above with respect to FIGS. 9-10 (e.g., track connectors 970, 1070), track connectors may connect track segments together and may provide weatherproofing, electrical isolation (except where electrical connectivity is intended), electromagnetic shielding and/or grounding, mechanical coupling to a proximate connector, and/or polarity management (poka-yoke) features.

As shown, the track connectors 1600, 1700 may be adapted to provide an electrical connection interface 1690, 1790 to ensure proper electrical communication between a primary conductor 1611, 1711 of a first track segment 1610, 1710 and a primary conductor 1621, 1721 of a second segment 1620, 1720.

The track connectors 1600, 1700 may further comprise one or more mechanical sealing interfaces 1675, 1676, 1775, wherein each sealing interface comprises a secure mechanical connection between a sealing mechanism of a first track segment 1610, 1710 and a sealing mechanism of a second track segment 1620, 1720. In some embodiments, the track connectors 1600, 1700 may comprise any number of features to enhance the sealing interfaces 1675, 1676 and 1775. Such features may include, but are not limited to, geometric shapes that enhance sealing, surface treatments (e.g., arc coronation), adhesives, epoxies, and/or RTV sealants. Additionally or alternatively, the shape of the track system housing and/or secondary conductors (e.g., 1612, 1622) may be selected to apply normal pressure to the sealing interfaces 1675, 1676, 1775 when vehicle weight is applied to the track system, therefore enhancing sealing.

In one embodiment, the track connector 1700 may be mounted to a roadway using a clamping plate 1780 made of steel or other structural material. In one embodiment, a low-friction material 1785 may be placed between the clamping plate 1780 and the connector 1700 to provide lateral compliance while maintaining downward force. This may be beneficial to accommodate thermal expansion and contraction of the system, as well as compliance during deployment and installation.

Although not shown, in some embodiments, the connectors 1600, 1700 may provide connections for auxiliary connections, such as a connection to a third conductor for voltage sensing. It will be appreciated that the track connectors 1600, 1700 may be made from any of the materials used to make the track segments, including rubber, plastic, and multi-layered composites as described above.

Figure 18:
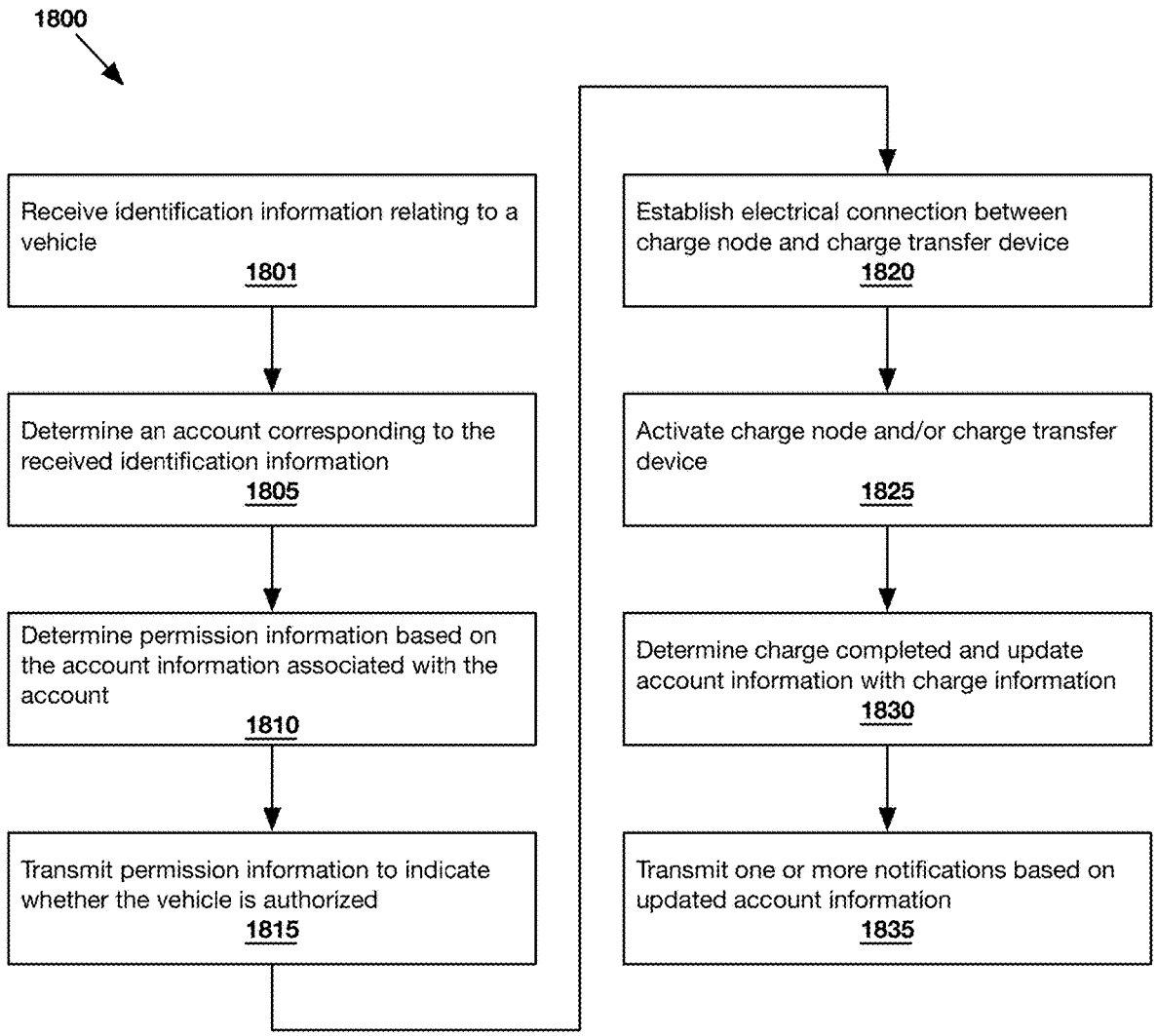
FIG. 18 shows an exemplary method of charging a vehicle according to an embodiment.

Referring to FIG. 18, an exemplary method 1800 for charging a vehicle at a charging facility is illustrated. As shown, the method begins at step 1801, where a vehicle stops at a charging location (e.g., above a charge node embedded within a roadway) of a charging facility and the system receives or determines vehicle identification information relating to the vehicle.

As discussed above, the system may receive vehicle identification information via manual entry or by automatically receiving such information from a component of the system. In one embodiment, the vehicle identification information be manually entered into the system by one or more users (e.g., a vehicle operator, a service provider and/or an admin user). For example, a user may input the vehicle identification information into a client application and such information may be transmitted to the MC system and stored in the database. As another example, a user may enter identification information into an input device, such as a keypad or touchscreen.

In another embodiment, a computing machine comprising an input unit may be employed to scan, read or otherwise determine such information. For example, an RFID reader located on a charge node may receive a vehicle ID from a communications unit located on/in the vehicle and/or a charge transfer device attached to the vehicle. Moreover, upon receiving the vehicle ID, the charge node may transmit the same to the MC system.

It will be appreciated that, in certain embodiments, the system may receive and/or determine charging location information in addition to vehicle identification information. Generally charging location information relates to a specific charge node or other system component with which a vehicle is attempting to interact. Typically, charging location information will comprise a unique charge node ID associated with the charge node to which the vehicle is attempting to connect in order to charge.

At step 1805, the system may determine an account corresponding to the received identification information. As discussed above, account information may include payment information and/or charging information. For example, account information may include one or more of: an amount paid, an amount due, one or more authorized operators, one or more authorized vehicles, one or more authorized charging facilities, and/or one or more authorized charging spaces or nodes associated with such authorized charging facilities.

At step 1810, the system may receive charging location information relating to the vehicle.

At step 1815, the system may receive, determine and/or generate permission information relating to whether the vehicle is authorized to charge at the charging facility and/or the charging location. In one embodiment, the system determines that the vehicle is authorized to charge in the charging facility based on any account information associated with the matching account (e.g., authorization information). For example, the system may determine that the account is current (i.e., fully paid up). As another example, the system may determine that the specific vehicle is authorized to charge in the charging facility where the vehicle identification information is received and/or at the time the vehicle identification information is received. And as yet another example, the system may determine that the vehicle is compatible with a specific charge node or other system component.

At step 1820, upon determining permission information, such information may be transmitted to one or more devices and/or systems to thereby allow the vehicle to charge at a charging location within the charging facility. In one embodiment, the system may display or otherwise transmit the permission information to a charge node to thereby cause the charge node to establish an electrical connection with the charge transfer device at step 1825. And, at step 1825, the charge node and charge transfer device may activate to charge the vehicle.

In certain embodiments, the system may perform one or more safety steps before activating at step 1825. For example, the charge node may determine a clean/safe connection; the charge transfer device may confirm the vehicle is in park mode; and/or the components may check that a "safe-to-connect" signal has been received. It will be appreciated that exposed contacts on the charge transfer device and the charge node may both be floating (safe for human touch) throughout steps 1801-1820. However, such components become electrically charged (not safe for human touch) at step 1825.

At step 1830, upon determining that charging has completed, the system may receive charging information from one or more system components and the system may update the account information to reflect such charging information.

Finally, at step 1835, the system may transmit one or more notifications based on the updated account information. For example, the system may determine the cost of a charge according to an amount of power provided to the vehicle and the system may generate and send an invoice to the customer for such cost.

Figure 19:
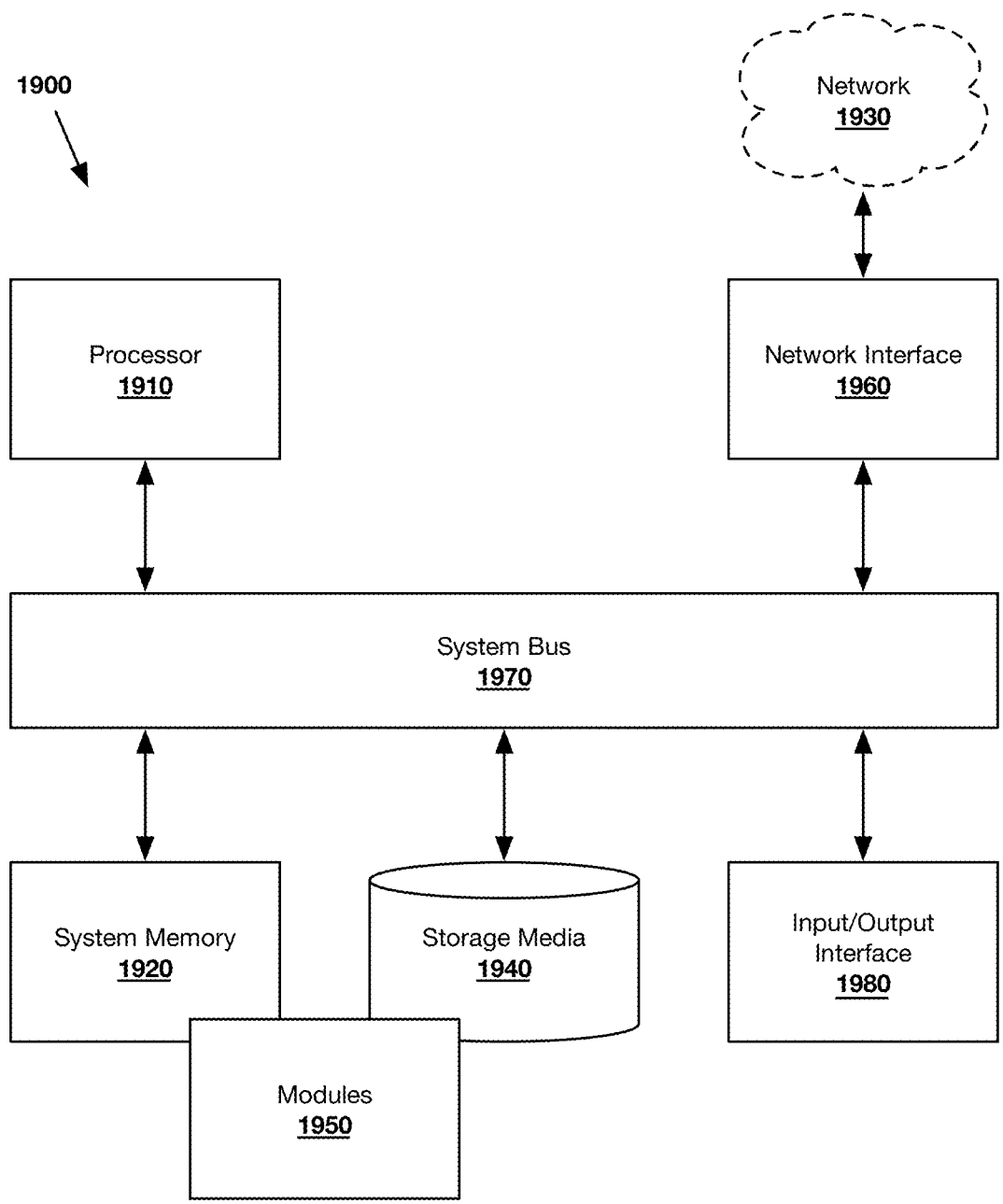
FIG. 19 shows an exemplary computing machine according to an embodiment.

Referring to FIG. 19, a block diagram is provided illustrating an exemplary computing machine 1900 and modules 1950 in accordance with one or more embodiments presented herein. The computing machine 1900 may represent any of the various computing systems discussed herein, such as but not limited to, the central MC system (FIG. 1 at 180), one or more of the MC subsystems (FIG. 1 at 181-185), a client device (FIG. 1 at 170) and/or a third-party system (FIG. 1 at 175). And the modules 1950 may comprise one or more hardware or software elements configured to facilitate the computing machine 1900 in performing the various methods and processing functions presented herein.

The computing machine 1900 may comprise all kinds of apparatuses, devices, and machines for processing data, including but not limited to, a programmable processor, a computer, and/or multiple processors or computers. As shown, an exemplary computing machine 1900 may include various internal and/or attached components, such as a processor 1910, system bus 1970, system memory 1920, storage media 1940, input/output interface 1980, and network interface 1960 for communicating with a network 1930.

The computing machine 1900 may be implemented as a conventional computer system, an embedded controller, a server, a laptop, a mobile device, a smartphone, a wearable device, a kiosk, a vehicular information system, one more processors associated with a display, a customized machine, any other hardware platform and/or combinations thereof. Moreover, a computing machine may be embedded in another device, such as but not limited to, a smartphone, a personal digital assistant ("PDA"), a tablet, a mobile audio or video player, a game console, a Global Positioning System ("GPS") receiver, or a portable storage device (e.g., a universal serial bus ("USB") flash drive). In some embodiments, the computing machine 1900 may be a distributed system configured to function using multiple computing machines interconnected via a data network or system bus 1970.

The processor 1910 may be configured to execute code or instructions to perform the operations and functionality described herein, manage request flow and address mappings, and to perform calculations and generate commands. The processor 1910 may be configured to monitor and control the operation of the components in the computing machine 1900. The processor 1910 may be a general-purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 1910 may be a single processing unit, multiple processing units, a single processing core, multiple processing cores, special purpose processing cores, coprocessors, or any combination thereof. In addition to hardware, exemplary apparatuses may comprise code that creates an execution environment for the computer program (e.g., code that constitutes one or more of: processor firmware, a protocol stack, a database management system, an operating system, and a combination thereof). According to certain embodiments, the processor 1910 and/or other components of the computing machine 1900 may be a virtualized computing machine executing within one or more other computing machines.

The system memory 1920 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 1920 also may include volatile memories, such as random-access memory ("RAM"), static random-access memory ("SRAM"), dynamic random-access memory ("DRAM"), and synchronous dynamic random-access memory ("SDRAM"). Other types of RAM also may be used to implement the system memory. The system memory 1920 may be implemented using a single memory module or multiple memory modules. While the system memory is depicted as being part of the computing machine 1900, one skilled in the art will recognize that the system memory may be separate from the computing machine without departing from the scope of the subject technology. It should also be appreciated that the system memory may include, or operate in conjunction with, a non-volatile storage device such as the storage media 1940.

The storage media 1940 may include a hard disk, a flash memory, other non-volatile memory device, a solid-state drive ("SSD"), any magnetic storage device, any optical storage device, any electrical storage device, any semiconductor storage device, any physical-based storage device, any other data storage device, or any combination or multiplicity thereof. The storage media 1940 may store one or more operating systems, application programs and program modules such as module, data, or any other information. The storage media may be part of, or connected to, the computing machine 1900. The storage media may also be part of one or more other computing machines that are in communication with the computing machine, such as servers, database servers, cloud storage, network-attached storage, and so forth.

The modules 1950 may comprise one or more hardware or software elements configured to facilitate the computing machine 1900 with performing the various methods and processing functions presented herein. The modules 1950 may include one or more sequences of instructions stored as software or firmware in association with the system memory 1920, the storage media 1940, or both. The storage media 1940 may therefore represent examples of machine or computer readable media on which instructions or code may be stored for execution by the processor. Machine or computer readable media may generally refer to any medium or media used to provide instructions to the processor. Such machine or computer readable media associated with the modules may comprise a computer software product. It should be appreciated that a computer software product comprising the modules may also be associated with one or more processes or methods for delivering the module to the computing machine 1900 via the network, any signal-bearing medium, or any other communication or delivery technology. The modules 1950 may also comprise hardware circuits or information for configuring hardware circuits such as microcode or configuration information for an FPGA or other PLD.

The input/output ("I/O") interface 1980 may be configured to couple to one or more external devices, to receive data from the one or more external devices, and to send data to the one or more external devices. Such external devices along with the various internal devices may also be known as peripheral devices. The I/O interface 1980 may include both electrical and physical connections for operably coupling the various peripheral devices to the computing machine 1900 or the processor 1910. The I/O interface 1980 may be configured to communicate data, addresses, and control signals between the peripheral devices, the computing machine, or the processor. The I/O interface 1980 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface may be configured to implement only one interface or bus technology. Alternatively, the I/O interface may be configured to implement multiple interfaces or bus technologies. The I/O interface may be configured as part of, all of, or to operate in conjunction with, the system bus 1970. The I/O interface 1980 may include one or more buffers for buffering transmissions between one or more external devices, internal devices, the computing machine 1900, or the processor 1910.

The I/O interface 1980 may couple the computing machine 1900 to various input devices including mice, touch-screens, scanners, biometric readers, electronic digitizers, sensors, receivers, touchpads, trackballs, cameras, microphones, keyboards, any other pointing devices, or any combinations thereof. When coupled to the computing device, such input devices may receive input from a user in any form, including acoustic, speech, visual, or tactile input.

The I/O interface 1980 may couple the computing machine 1900 to various output devices such that feedback may be provided to a user via any form of sensory feedback (e.g., visual feedback, auditory feedback, or tactile feedback). For example, a computing machine can interact with a user by sending documents to and receiving documents from a device that is used by the user (e.g., by sending web pages to a web browser on a user's client device in response to requests received from the web browser). Exemplary output devices may include, but are not limited to, displays, speakers, printers, projectors, tactile feedback devices, automation control, robotic components, actuators, motors, fans, solenoids, valves, pumps, transmitters, signal emitters, lights, and so forth. And exemplary displays include, but are not limited to, one or more of: projectors, cathode ray tube ("CRT") monitors, liquid crystal displays ("LCD"), light-emitting diode ("LED") monitors and/or organic light-emitting diode ("OLED") monitors.

Embodiments of the subject matter described in this specification can be implemented in a computing machine 1900 that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Accordingly, the computing machine 1900 may operate in a networked environment using logical connections through the network interface 1960 to one or more other systems or computing machines across a network.

The processor 1910 may be connected to the other elements of the computing machine 1900 or the various peripherals discussed herein through the system bus 1970. It should be appreciated that the system bus 1970 may be within the processor, outside the processor, or both. According to some embodiments, any of the processor 1910, the other elements of the computing machine 1900, or the various peripherals discussed herein may be integrated into a single device such as a system on chip ("SOC"), system on package ("SOP"), or ASIC device.

Figure 20:
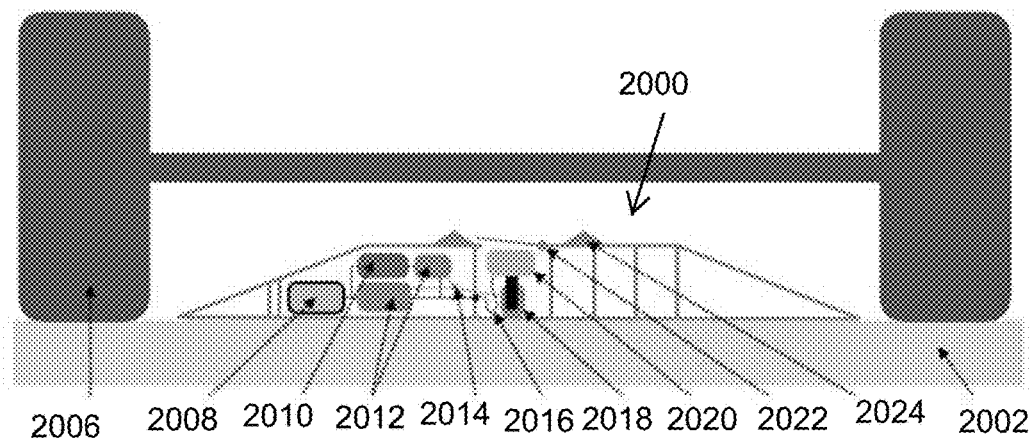
FIG. 20 shows a cross-section of road-based charge node on a roadway with a schematically shown vehicle above the node.

FIG. 20 shows a cross-section of road-based charge node 2000 on a roadway 2002 with a schematically shown vehicle 2004 above node 2000. Node 2000 is positioned between tires 2006 of the vehicle 2004 and includes a HV bus 2008, a precharge circuit 2010, contactors 2012, a sense circuit 2014, a flexible cable 2016, a vertical actuator 2018, a contact pad 2020, a hinged opening 2022 and alignment features 2024.

Figure 21:
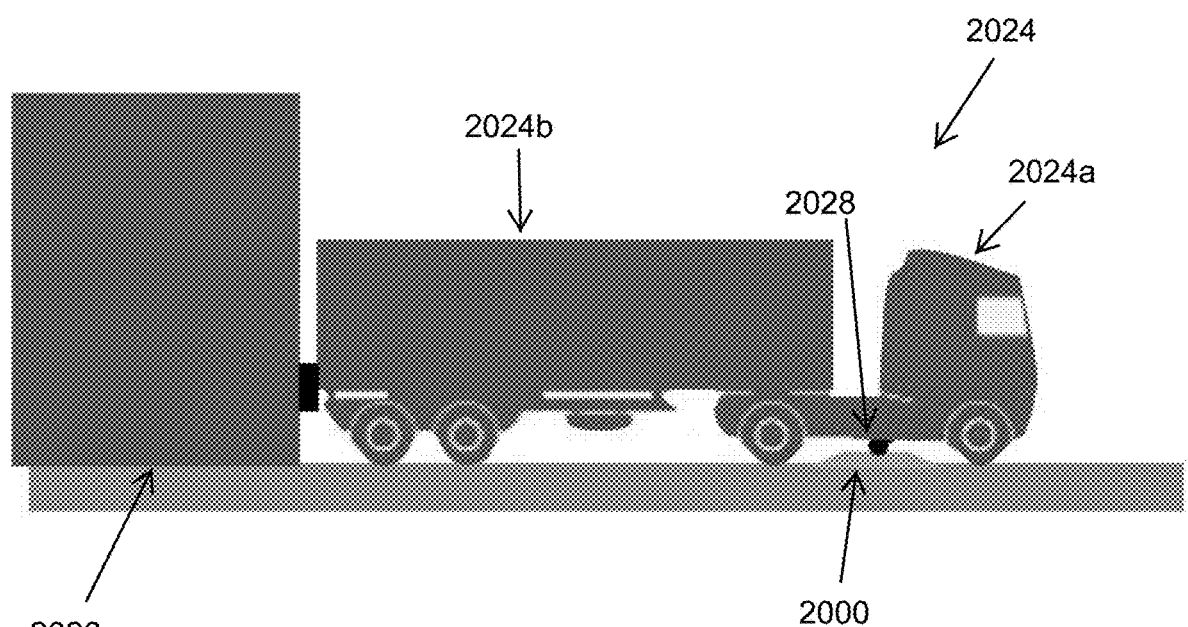
FIG. 21 shows one node charging a commercial semi-truck.

FIG. 21 shows one of nodes 2000 charging a commercial semi-truck 2024, which includes a tractor unit 2024a and a semi-trailer 2024b that is backed up to a loading dock 2026. Tractor unit 2024a includes a charge-receiver 2028.

Figure 22:
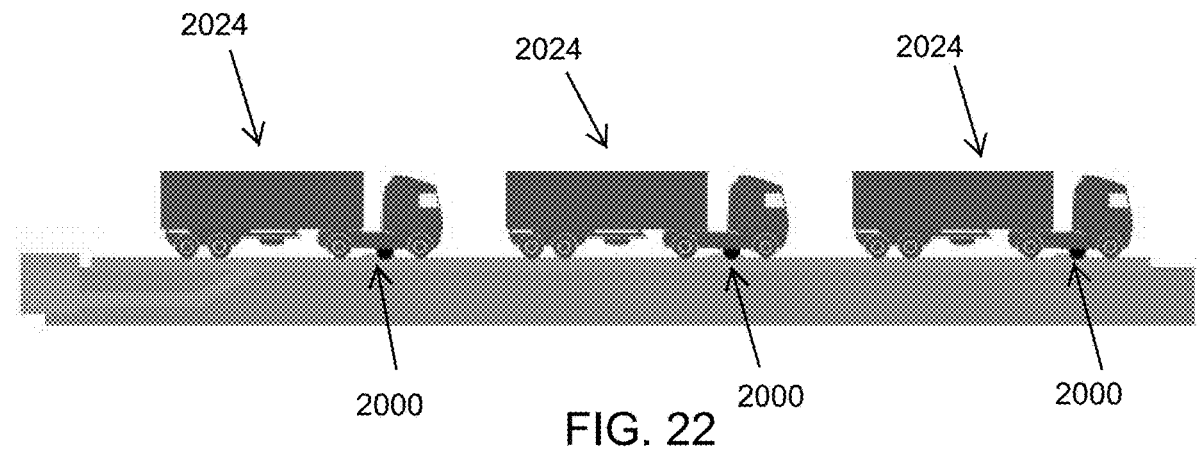
FIG. 22 shows a plurality of nodes each charging a commercial semi-truck.

FIG. 22 shows a plurality of nodes 2000 each charging a commercial semi-truck 2024. Trucks 2024 are in queue in adjacent spots.

Figure 23:
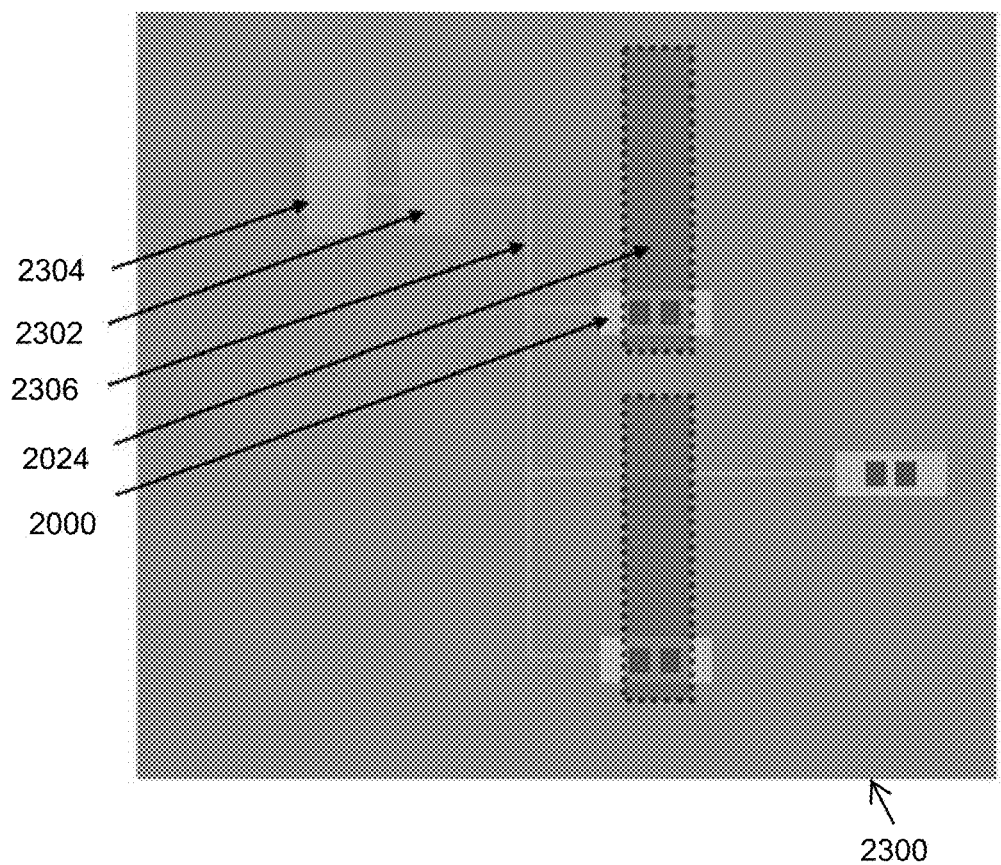
FIG. 23 shows a charging site including a plurality of nodes connected to an AC/DC transformer via power distribution lines.

FIG. 23 shows a charging site 2300 including a plurality of nodes 2000 connected to an AC/DC transformer 2302, which is connected to a utility transformer 2304, via power distribution lines 2306. Two trucks 2024 are lined up above two nodes 2000 and one node 2000 is vacant.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references, including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A charging system for electric vehicles comprising:
a charge transfer device in electrical communication with a power system of an electric vehicle, the charge transfer device comprising a conductor;
a power transformation module in electrical communication with a power supply, the power transformation module adapted to transform an electrical output received from the power supply; and
a charge node in electrical communication with the power transformation module via one or more power distribution lines, the charge node configured for being positioned below the charge transfer device and comprising:
a conductive charge pad powered by the power transformation module;
a housing configured for being connected on a roadway, the housing comprising an aperture,
wherein the charge pad is configured to activate only in a presence of the conductor of the charge transfer device, thereby causing the charge transfer device to transmit a conditioned electrical output to the power system of the electric vehicle; and
a power distribution module formed of a plurality of interchangeable sections, the power distribution module housing a plurality of power lines, the plurality of power lines configured to transmit power output from the power transformation module to the charge node.

2. The system according to claim 1, wherein the conductor of the charge transfer device is configured to move from an initial position to an extended position; and
the charge pad is configured to activate only when the conductor is in the extended position.

3. The system according to claim 2, wherein the conductor of the charge transfer device is in communication with an actuator that is configured to move the conductor from the initial position to the extended position.

4. The system according to claim 3, wherein the conductor is fixed to a mechanical structure; and
the actuator actuates the mechanical structure to move the conductor from the initial position to the extended position.

5. The system according to claim 1, wherein the charge transfer device further comprises:
a mechanical arm comprising:

a first end rotatably connected to a surface of the vehicle; and a second end; and an actuator in communication with the mechanical arm, wherein the conductor is fixed to the second end of the mechanical arm, and wherein the actuator is configured to rotate the second end of the mechanical arm to move the conductor from an initial position near the surface of the vehicle to an extended position near the charge pad, thereby causing the charge pad to activate.

6. The system according to claim 5, wherein the actuator of the charge node and the actuator of the charge transfer device are each selected from the group consisting of hydraulic actuators, pneumatic actuators, and electrical actuators.

7. A system according to claim 1, further comprising a power conditioning module located at the power transformation module, the charge node or the charge transfer device, the power conditioning module adapted to condition the transformed electrical output to a conditioned electrical output having a voltage suitable for transfer to the power supply of the electric vehicle.

8. A system according to claim 7, wherein the conditioned electrical output comprises a voltage of from about 300 V to about 1,000 V.

9. A system according to claim 8, wherein the conditioned electrical output comprises a voltage of from about 775 V to about 825 V.

10. The system according to claim 1, wherein the charge transfer device further comprises a communication unit that transmits vehicle identification information; and the charge node further comprises a communication unit that receives the vehicle identification information, wherein the charge node is activated based on said receiving the vehicle identification.

11. The system according to claim 1, wherein the charge node comprises one or more alignment features.

12. The system according to claim 1, further comprising a monitoring and control system in communication with the charge transfer device and/or the charge node via a network, wherein the monitoring and control system is adapted to monitor and control parameters relating to one or more of the group consisting of: voltage, current, frequency, inductance and resistance.

13. The system according to claim 1, wherein the one or more power distribution lines extend on the roadway.

14. The charging system according to claim 1, further comprising an actuator in communication with the charge pad, the actuator configured to move the charge pad, through the aperture, between a first position within the housing and a second position outside of the housing, the aperture being positioned above the roadway, the second position being above the first position.

15. The system according to, wherein the charge pad is activated only when moved to a second position.

16. A system according to claim 14, wherein the charge node further comprises an openable cover attached to the housing, the openable cover adapted to close the aperture when the charge pad is in the first position.

17. A system according to claim 14, wherein the charge node further comprises an activator adapted to activate the actuator of the charge node upon receiving a control signal.

18. The system according to claim 14, wherein the conductive charge pad is connected to the actuator by a support and the conductive charge pad is connected to an upper end of the support, the actuator configured to move the upper end of the support, through the aperture, as the conductive charge pad is moved between the first position within the housing and the second position outside of the housing.

19. The charging system according to claim 1, wherein the power transformation module transforms the electrical output received from the power supply to a first DC voltage.

20. The charging system according to claim 1, wherein the charge pad is configured to transmit a second DC voltage to the power system of the electrical vehicle.

* * * * *